US006354675B1

(12) United States Patent
Miyazaki

(10) Patent No.: US 6,354,675 B1
(45) Date of Patent: Mar. 12, 2002

(54) ABS APPARATUS

(75) Inventor: Nagao Miyazaki, Osaka (JP)

(73) Assignee: Japan Electronics Industry Ltd., Osaka (JP)

(*) Notice: Subject to any disclaimer, the term of this patent is extended or adjusted under 35 U.S.C. 154(b) by 0 days.

(21) Appl. No.: 09/214,475

(22) PCT Filed: May 20, 1998

(86) PCT No.: PCT/JP98/02222

§ 371 Date: Jan. 21, 1999

§ 102(e) Date: Jan. 21, 1999

(87) PCT Pub. No.: WO98/52803

PCT Pub. Date: Nov. 26, 1998

(30) Foreign Application Priority Data

| May 22, 1997 | (JP) | 9-132362 |
| May 22, 1997 | (JP) | 9-132363 |
| Oct. 21, 1997 | (JP) | 9-288266 |
| Jan. 21, 1998 | (JP) | 10-009614 |
| Jan. 21, 1998 | (JP) | 10-009615 |

(51) Int. Cl.$^7$ ................................................ B60T 8/60
(52) U.S. Cl. ...................... 303/150; 303/112; 303/154; 303/178
(58) Field of Search ................................ 303/150, 154, 303/178, 181, 184, 112

(56) References Cited

U.S. PATENT DOCUMENTS 3,711,162 A * 1/1973 Steinbrenner et al. ..... 303/21 R
3,713,704 A * 1/1973 Koppl et al. .............. 303/21 B (List continued on next page.)

FOREIGN PATENT DOCUMENTS

EP     363570 A1 *  4/1990  ............. B60T/8/00

OTHER PUBLICATIONS

JP, 07–156781, A (Aisin Seiki Co., Ltd.), Jun. 20, 1995.
JP, 09–118210, A (Japan Electronics Industry Ltd.), May 6, 1997.
JP, 09–002240, A (Japan Electronics Industry Ltd.), Jan. 7, 1997.
JP, 07–061340, A (Japan Electronics Industry Ltd.), Mar. 7, 1995.
JP, 08–152370, A (Japan Electronics Industry Ltd.), Jun. 11, 1996.
JP, 06–255591, A (Sumitomo Precision Products Co., Ltd.), Sep. 13, 1994.
JP, 62–160951, A (Hitachi, Ltd.), Jul. 16, 1987.

*Primary Examiner*—Christopher P. Schwartz
*Assistant Examiner*—Benjamin A Pezzlo
(74) *Attorney, Agent, or Firm*—Michael D. Bednarek; Shaw Pittman LLP

(57) ABSTRACT

An ABS apparatus according to the present invention has an arbitrary number of first sensors (15, 16) capable of obtaining road frictional force information according to road frictional force F acting between a wheel of a car and a road on which the car is moving and braking torque information according to braking torque T acting between the wheel of the car and a braking equipment, a differential parameter calculating means (21) for calculating a differential parameter M according to the road frictional force information and the braking torque information from these first sensors (15, 16), and a solenoid valve controlling means (23) for starting and then stopping a pressure reducing operation when the differential parameter M calculated by the differential parameter calculating means (21) reaches a first threshold provided according to a peak value of the differential parameter M or a second threshold having an absolute value slightly smaller than that of the first threshold while the barking equipment is in operation.

35 Claims, 21 Drawing Sheets

U.S. PATENT DOCUMENTS

| | | | | |
|---|---|---|---|---|
| 4,060,285 A | * | 11/1977 | Jones | 303/106 |
| 4,315,426 A | * | 2/1982 | Brandon | 73/9 |
| 4,338,669 A | * | 7/1982 | Skarvada | 364/426 |
| 4,504,911 A | * | 3/1985 | Braschel et al. | 364/426 |
| 4,538,700 A | * | 9/1985 | Suzuki | 180/248 |
| 4,882,693 A | * | 11/1989 | Yopp | 364/424.01 |
| 4,883,325 A | * | 11/1989 | Shimanuki et al. | 303/96 |
| 4,900,100 A | * | 2/1990 | Higashimata et al. | 303/100 |
| 4,951,198 A | * | 8/1990 | Watanabe et al. | 364/424.05 |
| 4,955,933 A | * | 9/1990 | Sistonen | 73/9 |
| 4,958,512 A | * | 9/1990 | Johnsen | 73/9 |
| 4,984,163 A | * | 1/1991 | Kuwana et al. | 364/426.02 |
| 5,056,354 A | * | 10/1991 | Kuwana et al. | 73/9 |
| 5,079,708 A | * | 1/1992 | Brown | 364/424.05 |
| 5,172,961 A | * | 12/1992 | Inoue et al. | 303/100 |
| 5,186,042 A | | 2/1993 | Miyazaki | 73/118.1 |
| 5,258,912 A | * | 11/1993 | Ghoneim et al. | 364/424.05 |
| 5,333,943 A | * | 8/1994 | Kashibawara et al. | 303/112 |
| 5,388,895 A | * | 2/1995 | Negrin | 303/103 |
| 5,505,532 A | * | 4/1996 | Tozu et al. | 303/198 |
| 5,522,652 A | * | 6/1996 | Negrin et al. | 303/154 |
| 5,553,930 A | * | 9/1996 | Rivard et al. | 303/174 |
| 5,564,800 A | * | 10/1996 | Fischle et al. | 303/140 |
| 5,568,962 A | * | 10/1996 | Enomoto et al. | 303/3 |
| 5,676,434 A | * | 10/1997 | Ichikawa et al. | 303/150 |
| 5,829,847 A | * | 11/1998 | Tozu et al. | 303/167 |
| 5,855,420 A | * | 1/1999 | Lawrence | 303/113.4 |
| 5,918,951 A | * | 7/1999 | Rudd | 303/150 |
| 5,944,392 A | * | 8/1999 | Tachihata et al. | 303/112 |
| 5,951,122 A | * | 9/1999 | Murphy | 303/163 |
| 5,971,499 A | * | 10/1999 | Pape et al. | 303/9.61 |
| 6,059,379 A | * | 4/2000 | Deml et al. | 303/15 |
| 6,196,643 B1 | * | 3/2001 | Yokoyama et al. | 303/166 |
| 6,203,121 B1 | * | 3/2001 | Kato et al. | 303/150 |

* cited by examiner

ABS APPARATUS

FIELD OF THE INVENTION

The present invention relates to an ABS (Antilock Brake System) apparatus for preventing wheels from being locked when quick braking is applied to a car.

BACKGROUND ART

A typical prior art ABS apparatus controls braking on a car wheel as follows. Specifically, the wheel is attached with a hub formed with gear teeth. When the gear teeth turn, the turning is detected by an electromagnetic pick up, and based on information detected by the electromagnetic pick up, a wheel speed is calculated. Next, a car speed is calculated from the wheel speed and signals from an acceleration sensor. Further, a slip rate is calculated from the wheel speed and the car speed, and this slip rate is used for controlling the braking on the wheel.

In such a system, it is very difficult to directly obtain the car speed, and therefore the car speed must be estimated from the wheel speed and the signals from the acceleration sensor. More specifically, it is impossible to obtain an accurate car speed, and as a result the control is inaccurate.

Further, when the car speed is slower, a pick-up cycle of the electromagnetic pick becomes accordingly longer, making the control more inaccurate. This problem is a serious shortcoming in the ABS apparatus since the ABS apparatus must keep performing from the time the car speed begins to decrease after a brake pedal is pressed to the time the car comes to a complete stop.

In order to solve the above problem, the inventor of the present invention proposed on ABS apparatus (Japanese Patent Laid-Open-9-2240) in which a differential parameter M according to a difference between road frictional force F and braking torque T is used in the control. Specifically, the ABS apparatus begins to reduce braking pressure when the differential parameter M decreases to a predetermined threshold while a brake is being applied.

However, the above ABS apparatus disclosed in the Japanese Patent Laid-Open 9-2240 does not make any proposal concerning control on a time for stopping the pressure reducing operation in the braking equipment. Further, no detailed proposal is made for control on varying the threshold for matching the timing for starting or stopping the pressure reducing operation concurrently with change in car speed and road conditions. Still further, no proposal is made for detecting or dealing with an over slip caused when the threshold value for starting or stopping the pressure reducing operation deviates from an ideal value.

DISCLOSURE OF THE INVENTION

It is therefore an object of the present invention to provide an ABS apparatus capable of controlling accurately regardless of change in the car speed or road conditions.

According to a first aspect of the present invention, an ABS apparatus comprises an arbitrary number of first sensors capable of obtaining road frictional force information according to road frictional force F acting between a wheel of a car and a road on which the car is moving, and braking torque information according to braking torque T acting between the wheel of the car and a braking equipment; and a differential parameter calculating means for calculating a differential parameter M according to the road frictional force information and the braking torque information from the first sensors. The ABS apparatus further comprises a brake fluid pressure controlling means for starting and then stopping a pressure reducing operation when the differential parameter M calculated by the differential parameter calculating means reaches a first threshold provided according to a peak value of the differential parameter M or a second threshold having an absolute value slightly smaller than that of the first threshold while the braking equipment is in operation.

According to a preferred embodiment of the present invention, the differential parameter calculating means obtains a value F-T as the differential parameter M by subtracting the braking torque T from the road frictional force F based on the braking torque information and road frictional force information from the first sensors.

According to another preferred embodiment of the present invention, the differential parameter calculating means obtains a value $(R/r)F-T$ as the differential parameter M based on the braking torque information and road frictional force information from the first sensors; where R is a radius of the wheel, and r is a distance from a center of turning in the wheel to a braking calipers of the braking equipment. The differential parameter M is obtained by having a ratio of the radius R to the distance r multiplied by a value of the road frictional force F, and then subtracting a value of the braking torque T from the product.

According to another preferred embodiment of the present invention, the differential parameter M while the car is making a turn is obtained by using a cornering force $F_s$ acting on the wheel vertically to a direction of car's motion, instead of using the road frictional force F, from road frictional force information according to this cornering force $F_s$ and braking torque information according to the braking torque T.

According to another preferred embodiment of the present invention, the ABS apparatus further comprises a steering angle sensor for detecting the steering angle of the wheel for calculating an angle of side slip $\beta$ as a deviation between an axis vertical to an axis of tire rotation and the direction in which the car is moving, and the cornering force $F_s$ is calculated from this angle of side slip $\beta$.

According to a second aspect of the present invention, an ABS apparatus comprises an arbitrary number of first sensors capable of obtaining road frictional force information according to road frictional force F acting between a wheel of a car and a road on which the car is moving, and braking torque information according to braking torque T acting between the wheel of the car and a braking equipment; a differential parameter calculating means for calculating a differential parameter M according to the road frictional force information and the braking torque information from the first sensors; and a brake fluid pressure controlling means for controlling brake fluid pressure of the braking equipment by using the differential parameter M and a first threshold according to a peak value of the differential parameter M. The ABS apparatus further comprises an arbitrary number of seconded sensors capable of obtaining gravitational acceleration information according to gravitational acceleration G acting on the car; and a gravitational acceleration change rate calculating means for calculating a gradient of locus given by the gravitational acceleration information from the second sensors. Road conditions are judged based on the gradient of the locus of gravitational acceleration information calculated by the gravitational acceleration change rate calculating means.

According to a preferred embodiment of the present invention, the brake fluid pressure controlling means starts and then stops a pressure reducing operation when the differential parameter M calculated by the differential parameter calculating means reaches a first threshold or a second threshold having an absolute value slightly smaller than that of the first threshold while the braking equipment is in operation.

According to another preferred embodiment of the present invention, the ABS apparatus further comprises a first threshold varying means for varying the first threshold according to the gradient of the locus of gravitational acceleration information calculated by the acceleration change rate calculating means.

According to a third aspect of the present invention, an ABS apparatus comprises an arbitrary number of first sensors capable of obtaining road frictional force information according to road frictional force F acting between a wheel of a car and a road on which the car is moving, and braking torque information according to braking torque T acting between the wheel of the car and a braking equipment; a differential parameter calculating means for calculating a differential parameter M according to the road frictional force information and the braking torque information from the first sensors; and a brake fluid pressure controlling means for controlling brake fluid pressure of the braking equipment by using the differential parameter M and a first threshold according to a peak value of the differential parameter M. The ABS apparatus further comprises a road frictional force change rate calculating means for calculating a difference between a value of the road frictional force information at a time of a current start of a pressure reducing operation and a value of the road frictional force information at a time of a previous start of the pressure reducing operation; and a first threshold varying means for varying the first threshold according to an amount of change in the road frictional force information calculated by the road frictional force change rate calculating means.

According to a preferred embodiment of the present invention, the brake fluid pressure controlling means starts and then stops a pressure reducing operation when the differential parameter M calculated by the differential parameter calculating means reaches a first threshold or a second threshold having an absolute value slightly smaller than that of the first threshold while the braking equipment is in operation.

According to a fourth aspect of the present invention, an ABS apparatus comprises an arbitrary number of first sensors capable of obtaining road frictional force information according to road frictional force F acting between a wheel of a car and a road on which the car is moving, and braking torque information according to braking torque T acting between the wheel of the car and a braking equipment; a differential parameter calculating means for calculating a differential parameter M according to the road frictional force information and the braking torque information from the first sensors; and a brake fluid pressure controlling means for controlling a brake fluid pressure by using the differential parameter M calculated by the differential parameter calculating means and a first threshold according to a peak value of the differential parameter M. The ABS apparatus further comprises an arbitrary number of second sensors capable of obtaining gravitational acceleration information according to gravitational acceleration G acting on the car, a wheel velocity parameter calculating means for calculating a wheel velocity parameter $M\omega$ by integrating a difference between the differential parameter M calculated by the differential parameter calculating means and the gravitational acceleration information from the second sensor; a two point difference calculating means for calculating at a predetermined time interval a difference in the wheel velocity parameter $M\omega$ calculated by the wheel velocity parameter calculating means; and a first threshold varying means for varying the first threshold according to the difference in the wheel velocity parameter $M\omega$ calculated by the two point difference calculating means.

According to a preferred embodiment of the present invention, the brake fluid pressure controlling means starts and then stops a pressure reducing operation when the differential parameter M calculated by the differential parameter calculating means reaches the first threshold or a second threshold having an absolute value slightly smaller than that of the first threshold while the braking equipment is in operation.

According to a fifth aspect of the present invention, an ABS apparatus comprises an arbitrary number of first sensors capable of obtaining road frictional force information according to road frictional force F acting between a wheel of a car and a road on which the car is moving, and braking torque information according to braking torque T acting between the wheel of the car and a braking equipment; a differential parameter calculating means for calculating a differential parameter M according to the road frictional force information and the braking torque information from the first sensors; and a brake fluid pressure controlling means for controlling a brake fluid pressure by using the differential parameter M calculated by the differential parameter calculating means and a first threshold according to a peak value of the differential parameter M. The ABS apparatus further comprises a wheel velocity parameter calculating means for calculating a wheel velocity parameter $M\omega$ by integrating a difference between the differential parameter M calculated by the differential parameter calculating means and a value proportional to that of the first threshold; a two point difference calculating means for calculating at a predetermined time interval a difference in the wheel velocity parameter $M\omega$ calculated by the wheel velocity parameter calculating means; and a first threshold varying means for varying the first threshold according to the difference in the wheel velocity parameter $M\omega$ calculated by the two point difference calculating means.

According to a preferred embodiment of the present invention, the brake fluid pressure controlling means starts and then stops a pressure reducing operation when the differential parameter M calculated by the differential parameter calculating means reaches a first threshold or a second threshold having an absolute value slightly smaller than that of the first threshold while the braking equipment is in operation.

According to a sixth aspect of the present invention, an ABS apparatus comprises an arbitrary number of first sensors capable of obtaining food frictional force information according to road frictional force F acting between a wheel of a car and a road on which the car is moving, and braking torque information according to braking torque T acting between the wheel of the car and a braking equipment; a differential parameter calculating means for calculating a differential parameter M according to the road frictional force information and the braking torque information from the first sensors; and a brake fluid pressure controlling means for controlling brake fluid pressure of the braking equipment by using the differential parameter M and a first threshold according to a peak value of the differential parameter M. The ABS apparatus further comprises a differential parameter change rate calculating means for calculating a rate of change $dM/dt$ in the differential parameter M calculated by the differential parameter calculating means; and an over-slip controlling means for judging an over slipping situation to be present in the wheel when the rate of change dM/dt calculated by the differential parameter change rate calculating means exceeds a third threshold and reducing a fluid pressure of the braking equipment while the braking equipment is in operation.

According to a preferred equipment of the present invention, the over-slip controlling means judges the over slipping situation to have been sufficiently eliminated and stops the pressure reducing operation of the braking equipment when a movement of the rate of change dM/dt calculated by the differential parameter change rate calculating means becomes smaller than a predetermined value after reducing the fluid pressure of the braking equipment.

According to another preferred embodiment of the present invention, the over-slip controlling means judges the over slipping situation to have been sufficiently eliminated and stops the pressure reducing operation of the braking equipment when a movement of the rate of change dM/dt calculated by the differential parameter change rate calculating means becomes smaller than a predetermined value continually for a plurality of times after reducing the fluid pressure of the braking equipment.

According to another preferred embodiment of the present invention, the over-slip controlling means judges the over slipping situation to have been sufficiently eliminated and stops the pressure reducing operation of the braking equipment if a value of M calculated by the differential parameter calculating means is greater than a predetermined value when a movement of the rate of change dM/dt calculated by the differential parameter change rate calculating means becomes smaller than a predetermined value after reducing the fluid pressure of the braking equipment.

According to another preferred embodiment of the present invention, the over-slip controlling means judges the over slipping situation to have been sufficiently eliminated and stops the pressure reducing operation of the breaking equipment if a value of M calculated by the differential parameter calculating means is greater than a predetermined value when a movement of the rate of change dM/dt calculated by the differential parameter change rate calculating means becomes smaller than a predetermined value continually for a plurality of times after reducing the fluid pressure of the braking equipment.

According to another preferred embodiment of the present invention, the ABS apparatus further comprises a first threshold varying means for varying the first threshold; and a first threshold resetting means for judging a friction coefficient to have decreased rapidly and setting the first threshold to a predetermined value if a value of the rate dM/dt calculated by the differential parameter change rate calculating means exceeds a fourth threshold having a sufficiently larger value than that of the third threshold while an over slipping situation is judged to be present by the over-slip controlling means.

According to another preferred embodiment of the present invention, the ABS apparatus further comprises a first threshold varying means for over slipping situation, for varying the first threshold according to a value of M calculated by the differential parameter calculating means when the over slipping situation of the wheel is judged to be present by the over-slip controlling means.

According to another preferred embodiment of the present invention, three absolute values are predetermined for the first threshold according to three respective levels of high $\mu$, middle $\mu$, and low $\mu$ according to the road friction coefficient. The first threshold varying means for over slipping situation replaces an absolute value of the first threshold with that of the low $\mu$ level if the differential parameter M calculated by the differential parameter calculating means has an absolute value not greater than a predetermined value having an absolute value slightly larger than that of the low $\mu$level, or replaces the absolute value of the first threshold with an average value of the current absolute value and that of the low $\mu$ level if the differential parameter M has an absolute value greater than a predetermined value having an absolute value slightly larger than that of the low $\mu$level but not greater than the absolute value for the middle $\mu$level, or replaces the absolute value of the first threshold with an average value of the current absolute value and that of the middle $\mu$ level if the differential parameter M has an absolute value greater than that of the middle $\mu$level, when the over slipping situation of the wheel is judged to be present by the over-slip controlling means.

According to a seventh aspect of the present invention, an ABS apparatus comprises an arbitrary number of first sensors capable of obtaining road frictional force information according to road frictional force F acting between a wheel of a car and a road on which the car is moving, and braking torque information according to braking torque T acting between the wheel of the car and a braking equipment. The ABS apparatus further comprises differential parameter calculating means for calculating a differential parameter M according to the road frictional force information and the braking torque information from the first sensors; a wheel velocity parameter calculating means for calculating a wheel velocity parameter M$\omega$ which becomes 0 when the wheel is locked, by correcting and then integrating the differential parameter M calculated by the differential parameter calculating means; and a brake fluid pressure controlling means for controlling the fluid pressure of the braking equipment by using the wheel velocity parameter M$\omega$ calculated by the wheel velocity parameter calculating means.

According to a preferred embodiment of the present invention, the ABS apparatus further comprises an arbitrary number of second sensors capable of obtaining gravitational acceleration information according to gravitational acceleration G acting on the car. The wheel velocity parameter calculating means obtains the wheel velocity parameter M$\omega$ by integrating a difference between the differential parameter M and the gravitational acceleration G based on the gravitational acceleration information.

According to another preferred embodiment of the present invention, the wheel velocity parameter calculating means obtains the wheel velocity parameter M$\omega$ by integrating a difference between the differential parameter M and a value proportional to the first threshold according to a peak value of the differential parameter M.

According to another preferred embodiment of the present invention, the ABS apparatus further comprises an arbitrary number of second sensors capable of obtaining gravitational acceleration information according to gravitational acceleration G acting on the car; a gravitational acceleration change rate calculating means for calculating a gradient in a locus given by the gravitational acceleration G according to the gravitational acceleration information; and a first threshold varying means for varying the first threshold according to the gradient in the locus given by the gravitational acceleration G calculated by the gravitational acceleration change rate calculating means.

According to a preferred embodiment of the present invention, the ABS apparatus further comprises a two point difference calculating means for calculating a difference in the wheel velocity parameter Mω at a predetermined time interval; and a first threshold varying means for varying the first threshold according to the difference in the wheel velocity parameter Mω calculating by the two point difference calculating means.

According to a preferred embodiment of the present invention, the ABS apparatus further comprises a road frictional force change rate calculating means for calculating a difference between a value of the road frictional force information at a time of a current start of a pressure reducing operation and a value of the road frictional force information at a time of a previous start of the pressure reducing operation; and a first threshold varying means for varying the first threshold according to an amount of change in the road frictional force information calculated by the road frictional force change rate calculating means.

According to another preferred embodiment of the present invention, the ABS apparatus further comprises an arbitrary number of second sensors capable of obtaining gravitational acceleration information according to gravitational acceleration G acting on the car; and a gravitational acceleration integrating means for integrating the gravitational acceleration G. The brake fluid pressure controlling means sets a reference line by translating the locus of the integration given by the gravitational acceleration integrating means so as to include a value of the wheel velocity parameter Mω at a time when a brake fluid pressure reducing operation is started, and stops the brake fluid pressure reducing operation when the wheel velocity parameter Mω crosses the reference line after the brake fluid pressure reducing operation is started.

According to another preferred embodiment of the present invention, the brake fluid pressure controlling means sets a reference straight line passing a value of the wheel velocity parameter Mω at a time when a brake fluid pressure reducing operation is started and a value of the wheel velocity parameter Mω at a time retrospective by a predetermined amount of time to the time when the brake fluid pressure reducing operation is started, and stops the brake fluid pressure reducing operation when the wheel velocity parameter Mω crosses the reference line after the brake fluid pressure reducing operation is started.

According to another preferred embodiment of the present invention, the brake fluid pressure controlling means compares a gradient of the current reference line with that of a previous reference line, and corrects the current reference line by selecting a longer time interval than the predetermined time interval if there is an increase in the gradient, or by selecting a shorter time interval than the predetermined time interval if there is a decrease in the gradient.

According to another preferred embodiment of the present invention, the brake fluid pressure controlling means detects a time point when the differential parameter M has increased to a second threshold provided according to a peak value of the differential parameter M after starting a brake fluid pressure reducing operation, and stops the brake fluid pressure reducing operation if the above time point is after a predetermined minimum time period for the pressure reducing operation and if the brake fluid pressure reducing operation is not stopped yet.

According to another preferred embodiment of the present invention, the ABS apparatus further comprises an arbitrary number of second sensors capable of obtaining gravitational acceleration information according to gravitational acceleration G acting on the car; and a gravitational acceleration integrating means for integrating the gravitational acceleration G according to the gravitational information. The brake fluid pressure controlling means sets a quick pressurization judging line by translating the locus of the integration given by the gravitational acceleration integrating means so as to include a value slightly larger than that of the wheel velocity parameter Mω at a time when a brake fluid pressure reducing operation is started, for rapidly increasing the brake fluid pressure when the wheel velocity parameter Mω crosses the quick pressurization judging line after the brake fluid pressure reducing operation is stopped.

According to another preferred embodiment of the present invention, the ABS apparatus further comprises an arbitrary number of second sensors capable of obtaining gravitational acceleration information according to gravitational acceleration G acting on the car; and a gravitational acceleration integrating means for integrating the gravitational acceleration G according to the gravitational acceleration information. The brake fluid pressure controlling means judges an over slipping situation to be present in the wheel if a gradient of the locus given by the integration performed by the gravitational acceleration integrating means is smaller than a predetermined value when the wheel velocity parameter Wω turns from decreasing to increasing.

According to another preferred embodiment of the present invention, the differential parameter calculating means obtains a value F-T by subtracting the braking torque T from the road frictional force F based on the braking torque information and road frictional force information from the first sensors as the differential parameter M.

According to another preferred embodiment of the present invention, the differential parameter calculating means obtains a value $(R/r)F-T$ as the differential parameter M based on the braking torque information and road frictional force information from the first sensors; where R is a radius of the wheel, and r is a distance from a center of turning in the wheel to a braking calipers of the braking equipment. The differential parameter M is obtained by having a ratio of the radius R to the distance r multiplied by a value of the road frictional force F, and then subtracting a value of the braking torque T from the product.

According to another preferred embodiment of the present invention, the differential parameter M while the car is making a turn is obtained by using a cornering force $F_s$ acting on the wheel vertically to a direction of car's motion, instead of using the road frictional force F, from road frictional force information according to this cornering force $F_s$ and braking torque information according to the braking torque T.

According to another preferred embodiment of the present invention, the ABS apparatus further comprises a steering angle sensor for detecting the steering angle of the wheel for calculating an angle of side slip β as a deviation between an axis vertical to an axis of tire rotation and the direction in which the car is moving, and the cornering force $F_s$ is calculated from the angle of side slip β.

According to an eighth aspect of the present invention, an ABS apparatus comprises an arbitrary number of first sensors capable of obtaining road frictional force information according to road frictional force F acting between a wheel of a car and a road on which the car is moving, and braking torque information according to braking torque T acting between the wheel of the car and a braking equipment. The the ABS apparatus further comprises a differential parameter calculating means for calculating a differential parameter M according to a difference between the road frictional force information and the braking torque information from the first sensors; a wheel velocity parameter calculating means for calculating a wheel velocity parameter Mω which becomes 0 when the wheel is locked, by correcting and then integrating the differential parameter M calculated by the differential parameter calculating means; a wheel velocity acceleration parameter calculating means for calculating a wheel velocity acceleration parameter dMω/dt by differentiating the wheel velocity parameter Mω calculated by the wheel velocity parameter calculating means, and a brake fluid pressure controlling means for controlling the fluid pressue of the braking equipment by using the wheel acceleration parameter dM ω /dt calculated by the wheel acceleration parameter calculating means.

According to a preferred embodiment of the present invention, the ABS apparatus further comprises an arbitrary number of second sensors capable of obtaining gravitational acceleration information according to gravitational acceleration G acting on the car. The wheel velocity parameter calculating means obtains the wheel velocity parameter Mω by integrating a difference between the differential parameter M and the gravitational acceleration G based on the gravitational acceleration information.

According to another preferred embodiment of the present invention, the ABS apparatus further comprises an arbitrary number of second sensors capable of obtaining gravitational acceleration information according to gravitational acceleration G acting on the car; a gravitational acceleration change rate calculating means for calculating a gradient in a locus given by the gravitational acceleration G according to the gravitational acceleration information; and a first threshold varying means for varying the first threshold according to the gradient in the locus given by the gravitational acceleration G calculated by the gravitational acceleration change rate calculating means.

According to another preferred embodiment of the present invention, the ABS apparatus further comprises a two point difference calculating means for calculating a difference in the wheel velocity parameter Mω at a predetermined time interval; and a first threshold varying means for varying the first threshold according to the difference in the wheel velocity parameter Mω calculated by the two point difference calculating means.

According to another preferred embodiment of the present invention, the ABS apparatus further comprises a road frictional force change rate calculating means for calculating a difference between a value of the road frictional force F at a time of a current start of a pressure reducing operation and a value of the road frictional force F at a time of a previous start of the pressure reducing operation; and a first threshold varying means for varying the first threshold according to an amount of change in the road frictional force F calculated by the road frictional force change rate calculating means.

According to another preferred embodiment of the present invention, the brake fluid pressure controlling means stops the pressure reducing operation when wheel acceleration parameter dMω/dt reaches a second threshold after the brake fluid pressure reducing operation is started.

According to another preferred embodiment of the present invention, the brake fluid pressure controlling means rapidly increases the brake fluid pressure when the wheel acceleration parameter dMω/dt reaches a fifth threshold after the brake fluid pressure reducing operation is stopped.

According to another preferred embodiment of the present invention, the differential parameter calculating means obtains a value F-T as the differential parameter M by subtracting the braking torque T from the road frictional force F based on the braking torque information and road frictional force information from the first sensors.

According to another preferred embodiment of the present invention, the differential parameter calculating means obtains a value (R/r)F-T as the differential parameter M based on the braking torque information and road frictional force information from the first sensors; where R is a radius of the wheel, and r is a distance from a center of turning in the wheel to a braking calipers of the braking equipment. The differential parameter M is obtained by having a ratio of the radius R to the distance r multiplied by a value of the road frictional force F, and then subtracting a value of the braking torque T from the product.

According to another preferred embodiment of the present invention, the differential parameter M while the car is making a turn is obtained by using a cornering force $F_s$ acting on the wheel vertically to a direction of car's motion, instead of using the road frictional force F, from road frictional force information according to this cornering force $F_s$ and braking torque information according to the braking torque T.

According to another preferred embodiment of the present invention, the ABS apparatus further comprises a steering angle sensor for detecting the steering angle of the wheel for calculating an angle of side slip β as a deviation between an axis vertical to an axis of tire rotation and the direction in which the car is moving, and the cornering force $F_s$ is calculated from the angle of side slip β.

Other various features and advantages of the present invention will become clear from description given below with reference to the accompanying drawings.

BEST MODES FOR CARRYING OUT THE INVENTION

Now, embodiments of the present invention will be described with reference to FIGS. 1 through 24.

Figure 1:
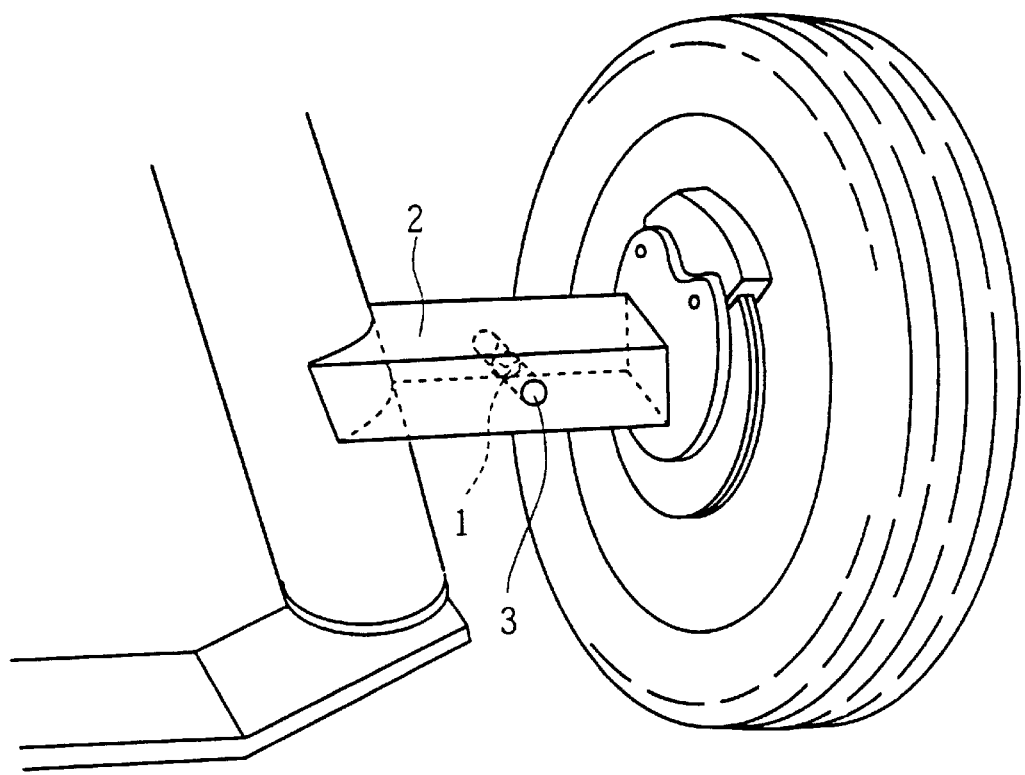
FIG. 1 is an illustration showing disposition of a sensor block of an ABS apparatus as an embodiment of the present invention.

FIG. 1 is an illustration showing disposition of a sensor block of an ABS apparatus as an embodiment of the present invention. The sensor block 1 is mounted in a hole 3 formed in an axle 2 of a car. The hole 3 may not necessarily be formed in the axle 2 itself, but may be formed at an adjacency to the axle 2.

Figure 2:
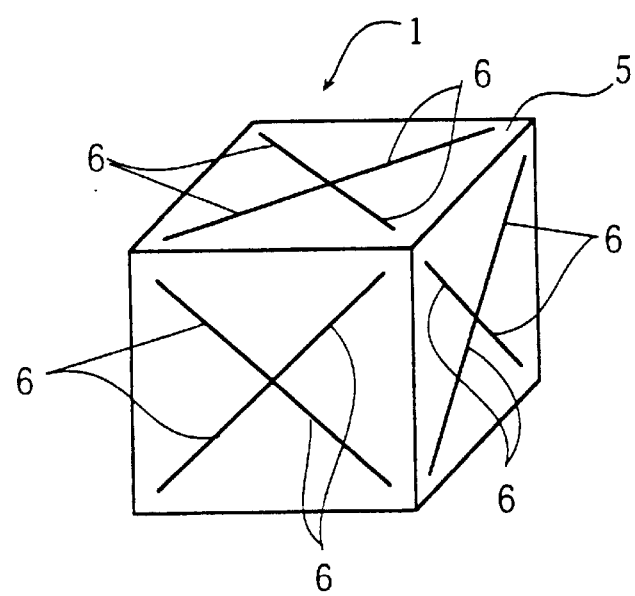
FIG. 2 is a perspective view of the sensor block of the ABS apparatus as the embodiment of the present invention.

FIG. 2 is a perspective view of the sensor block 1. The sensor block 1 is a cube comprising substrates 5 made of a metal or a silicon for example. Each surface of the substrates is attached with a stress-strain gage 6 comprising four strips of metal foil resistors disposed in a form of a cross. The substrates 5 may not necessarily be made into a cube. Alternatively, there may be three plates each having an upper and a lower surfaces attached with a stress-strain gage 6 in a form of a cross for example,. In such a case these three substrates are mounted in the hole 3.

Figure 3:
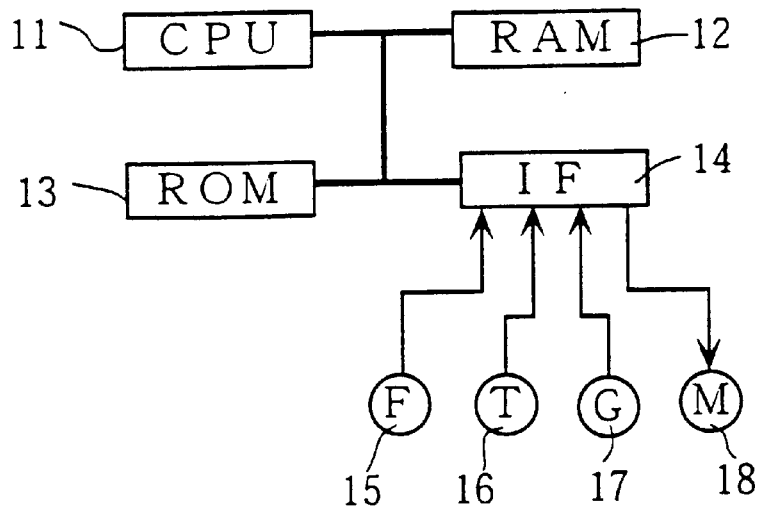
FIG. 3 is a circuitry block diagram of the ABS apparatus according to the embodiment of the present invention.

FIG. 3 is a circuitry block diagram of the ABS apparatus according to the embodiment of the present invention. This ABS apparatus comprises a CPU (central processing unit) 11 for controlling the entire ABS apparatus, a RAM (random access memory) 12 used as a work memory for the CPU, a ROM (read only memory) 13 which stores programs and data, and an interface 14 for controlling signal transfer between the CPU and input-output equipment such as sensors and solenoid valves. The interface 14 can convert incoming analog signals to digital signals, as well as outgoing digital signals to analog signals. The interface 14 is connected with road frictional force sensors 15 each outputs a voltage proportional to road frictional force F acting between the car wheel and a road surface, brake torque sensors 16 each outputs a voltage proportional to braking torque T acting between the car wheel and a braking equipment, gravitational acceleration sensors 17 each outputs a voltage proportional to gravitational acceleration G acting on the car, and solenoid valves 18 each for controlling hydraulic pressure of the braking equipment. Each of the road frictional force sensors 15, braking torque sensors 16, and gravitational acceleration sensors 17 is realized by the stress-strain gauge 6 in the sensor block 1. It should be noted here that each of the car wheels is provided with each one of the road frictional force sensors 15, braking torque sensors 16, gravitational acceleration sensors 17, and the solenoid valves 18, so the hydraulic pressure control is performed for each of the car wheels.

Figure 4:
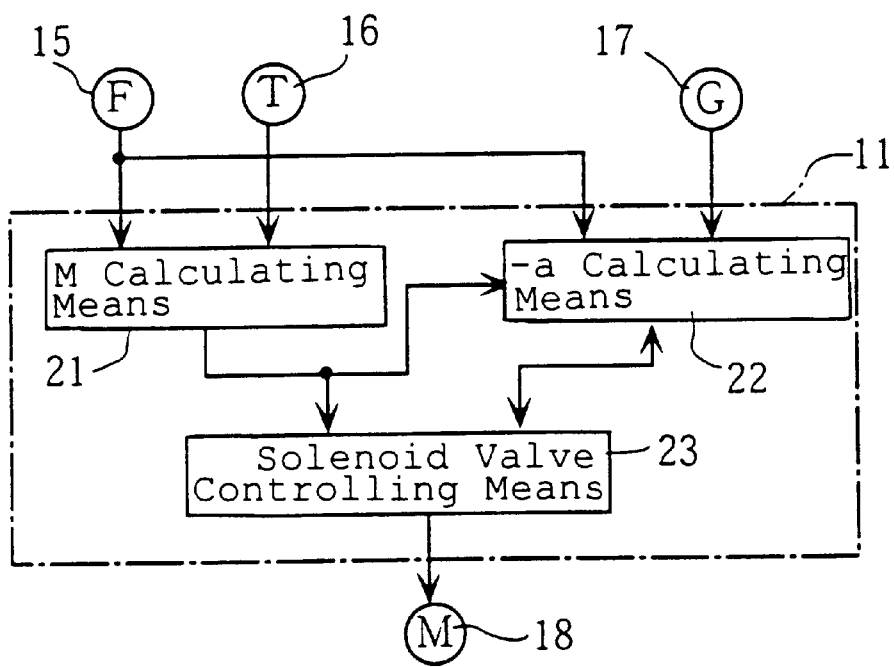
FIG. 4 is a block diagram showing a virtual circuitry relationship created by a CPU of the ABS apparatus according to the embodiment of the present invention.

FIG. 4 is a block diagram showing a virtual circuitry relationships realized by the CPU 11 while the CPU is running a program stored in the ROM 13. Specifically, the CPU 11 provides M calculating means 21, -a calculating means 22, and solenoid valve controlling means 23. Each of these circuitry is realized by the CPU 11 in its execution of an ABS control program stored in the ROM 13 when a brake pedal of the car is depressed. Though not illustrated in the figure, the pressing of the brake pedal is judged by the CPU 11 according to detection signals from a sensor mounted to the brake pedal or a sensor monitoring brake fluid pressure in the braking equipment.

The M calculating means 21 receives via the interface 14 the road frictional force information F from the road frictional force sensor 15, and the braking torque information T from the braking torque sensor 16 for calculating a differential parameter $M=F-T$.

The -a calculating means 22 receives via the interface 14 the road frictional force information F from the road frictional force sensor 15, and the gravitational acceleration information G from the gravitational acceleration sensor 17 for calculating a value for -a as a first threshold. Specifically, the gravitational acceleration information G is monitored at a predetermined time interval. A difference between current gravitational acceleration information G and previous gravitational acceleration information G is used for calculating a gradient of a locus given by the gravitational acceleration information G, and according to this gradient, -a is varied continuously or in a stepped manner. Further, the -a calculating means 22 also varies -a, continuously or in a stepped manner, according to a difference between a current road friction force information F at the time of current start of a pressure reducing operation and a previous road friction force information F at a time of the previous start of the pressure reducing operation. It should be noted that an initial value of -a when the brake pedal begins being depressed is predetermined according to a standard peak value in the negative direction of the differential parameter M, and is stored in the ROM 13.

Further, the -a calculating means 22 updates -a as the first threshold value when an over-slip occurrence signal is received from the solenoid valve control means 23. Specifically, when the solenoid valve control means 23 judges that an over slipping situation is present in the wheel, the absolute value of the differential parameter M calculated by the M calculating means 21 is compared with predetermined values. Specifically, if this absolute value is not greater than a predetermined value which is slightly larger than a predetermined absolute value for −a for a low $\mu$ condition, then current absolute value of −a is replaced by the predetermined absolute value for −a for the low $\mu$ condition: If greater than the predetermined value which is slightly larger than the absolute value for −a for the low $\mu$ condition yet not greater than a predetermined absolute value for −a for a middle $\mu$ condition, then the current absolute value of −a is replaced by an average of the current absolute value of −a and the predetermined absolute value for −a for the low $\mu$ condition: If greater than the predetermined absolute value for −a for the middle $\mu$ condition, then the current absolute value of −a is replaced by an average of the current absolute value of −a and the predetermined value of −a for the middle $\mu$ condition. Of course a plus sign or minus sign is selected for the new value of −a according to the sign of the differential parameter M. It should be noted here that a total of three predetermined absolute values for −a are stored in the ROM 13 respectively for the low $\mu$, middle $\mu$, and high $\mu$ conditions according to a friction coefficient of the road. The absolute value for −a for the high $\mu$condition is greater than that for the middle $\mu$ condition, and likewise the absolute value for −a for the middle $\mu$ condition is greater than that for the low $\mu$condition.

Still further, the −a calculating means 22 updates the value of −a as the first threshold value, when a jumping-down occurrence signal is received from the solenoid controlling means 23. Specifically, when the solenoid controlling means 23 judges that a jumping-down situation is present, −a is set to the predetermined value for the low $\mu$ condition.

The solenoid controlling means 23 switches power supply to a solenoid of the solenoid valve 18 according to the differential parameter M from the M calculating means 21 and −a from the −a calculating means 22. Specifically, the solenoid control ling means 23 starts reducing brake fluid pressure when the value of differential parameter M from the M calculating means 21 has decreased to the value of −a from the −a calculating means 22. Then, the solenoid controlling means 23 sets a second threshold as +a which has an absolute value equal to or slightly greater than that of −a supplied by the −a calculating means 22, and stops the brake fluid pressure reducing operation when the differential parameter M from the M calculating means 21 has increased to +a. After stopping the brake, fluid pressure reducing operation, the brake fluid pressure is gradually increased by repeating a cycle of increasing the pressure for 10 mm. second and maintaining the pressure for 40 mm second for example.

Further, the solenoid controlling means 23 starts the brake fluid pressure reducing operation when the solenoid controlling means 23 judges that there is an over slipping situation. Specifically, if the solenoid controlling means 23 finds the differential parameter M from the M calculating means 21 changing at a rate dM/dt greater than a value of a third threshold, the solenoid controlling means judges that there is an over slipping situation, starts the brake fluid pressure reducing operation, and outputs the over-slip occurrence signal to the −a calculating means 22.

Further, the solenoid controlling means 23 judges the occurrence of a jumping-down situation, and outputs the jumping-down occurrence signal to the −a calculating means 22. Specifically, while the wheel is over slipping, if the rate of change dM/dt of the differential parameter M from the M calculating means 21 has exceeded a fourth threshold which has a value sufficiently greater than that of the third threshold, the solenoid controlling means 23 judges that there is a sharp decrease in the friction coefficient of the road, and outputs the jumping-down occurrence signal to the −a calculating means 22.

Next, a cycle of actions which takes place in the ABS apparatus is described. When the brake pedal is depressed, the solenoid controlling means 23 monitors the differential parameter M from the M calculating means 21 and −a from the −a calculating means 22. When the differential parameter M has decreased to −a, then the solenoid controlling means 23 operates the solenoid 18 for reducing the brake fluid pressure. The solenoid controlling means 23 then calculates a value for +a as the second threshold, i.e. the absolute value equal to or slightly greater than that of −a supplied by the −a calculating means 22. The solenoid controlling means 23 keeps monitoring the differential parameter M supplied by the M calculating means 21, and operates the solenoid valve 18 to stop reducing the brake fluid pressure when the differential parameter M has increased to +a. The solenoid controlling means 23 then repeats the cycle of increasing the pressure for 10 mm second and maintaining the pressure for 40 mm second for example, gradually increasing the brake fluid pressure.

The above cycle of pressure reducing control and pressure raising control of the brake fluid is repeated until the car comes to a complete stop.

During the above control cycle, the −a calculating means 22 updates −a according to a gradient of the gravitational acceleration G. Specifically, the gradient of the gravitational acceleration G is large if a road has a large road friction coefficient $\mu$, whereas the gradient of the gravitational acceleration G is small on a road having a small road friction coefficient $\mu$. Thus, by varying −a as the first threshold according to this road condition, start timing and stop timing of the brake fluid pressure reducing operation are varied. It should be noted here that the value of the second threshold, i.e. +a, varies in accordance with −a when −a is varied since +a is set to have an absolute value equal to or slightly smaller than that of −a. For this reason, by varying only −a as the first threshold, not only the timing to start the brake fluid pressure reducing operation but also the timing to stop the pressure reducing operation are changed.

Further, the −a calculating means 22 updates −a according to a difference in the road frictional force F found in each cycle of the pressure reducing control. Specifically, a difference between a current road frictional force F and a road frictional force F in the previous control cycle is multiplied by a predetermined coefficient. The product of the above calculation is then multiplied by the previous value of −a, and the result is subtracted from the previous value of −a to give a current value for −a. In other words, if the difference between the road frictional force F at the current start of the pressure reducing operation and the road frictional force F at the previous start of the pressure reducing operation is multiplied by the predetermined coefficient and then multiplied by the previous value of −a, the product is equal to a difference between the previous value of −a and the current value of −a. More specifically, the value of −a is varied according to variation in the moment of inertia resulting from change in the car's speed.

As described above, −a is controlled according to the road condition and other conditions. However, there is an occasion in which an abrupt change in road conditions or a delay in the control system spins −a out of an ideal value, causing an over slipping situation before the differential parameter M has decreased to −a. The over slipping situation is a situation immediately leading to a locking situation, with the wheel still rotating but the speed of rotation beginning to drop very sharply. In order to eliminate this problem, the solenoid controlling means 23 which calculates the rate of change dM/dt of the differential parameter M supplied by the M calculating means 21 judges that the over slipping situation is present in the wheel if the rate dM/dt has exceeded the third threshold while the braking equipment is in operation. The solenoid controlling means 23 then reduces the brake fluid pressure, and at the same time outputs the over-slip occurrence signal to the −a calculating means 22. After reducing the brake fluid pressure, when the rate of change dM/dt of the differential parameter M comes within a predetermined range, then the solenoid controlling means 23 judges that the over slipping situation has been eliminated sufficiently, and stops the brake fluid pressure reducing operation.

Such an over slipping situation means that −a is out of an ideal value. Therefore, upon reception of the over-slip occurrence signal from the solenoid controlling means 23, the −a calculating means 22 changes the value of −a according to the value of the differential parameter M supplied by the M calculating means 21. Specifically, if the differential parameter M has an absolute value not greater than the predetermined value which is slightly larger than the absolute value predetermined for −a for the low $\mu$ condition, then the absolute value predetermined for −a for the low $\mu$ condition is used as the new absolute value of −a. If the absolute value of the differential parameter M is greater than the predetermined value which is slightly larger than the absolute value predetermined for −a for the low $\mu$ condition but not greater than the absolute value predetermined for −a for the middle $\mu$ condition, then an average of the current absolute value of −a and the absolute value predetermined for −a for the low $\mu$ condition is used as the new absolute value of −a. If the absolute value of the differential parameter M is greater than the absolute value predetermined for −a for the middle $\mu$ condition, then an average of the current absolute value of −a and the absolute value predetermined for −a for the middle $\mu$ condition is used as the new absolute value of −a.

If there is a change in road surface, from a dry asphalt to a wet steel plate for example, there is a very sharp drop in the road friction coefficient (hereinafter such a situation is referred to as jumping-down situation). In such a case, change from the over slipping situation to the locking situation occurs so rapidly that the value of −a must be replaced with the ideal value very quickly in order to prevent the locking. For this reason, while the wheel is over slipping, if the rate of change dM/dt of the differential parameter M has exceeded a fourth threshold which has a value sufficiently greater than that of the third threshold, the solenoid controlling means 23 judges that there is a sharp decrease in the friction coefficient of the road, and outputs the jumping-down occurrence signal to the −a calculating means 22. Upon receiving the jumping-down occurrence signal, the −a calculating means 22 replaces current value of −a with the value for the low $\mu$ condition.

Now, theoretic discussion will be made for reasons why the above cycles of actions can provide superior ABS control.

Figure 5:
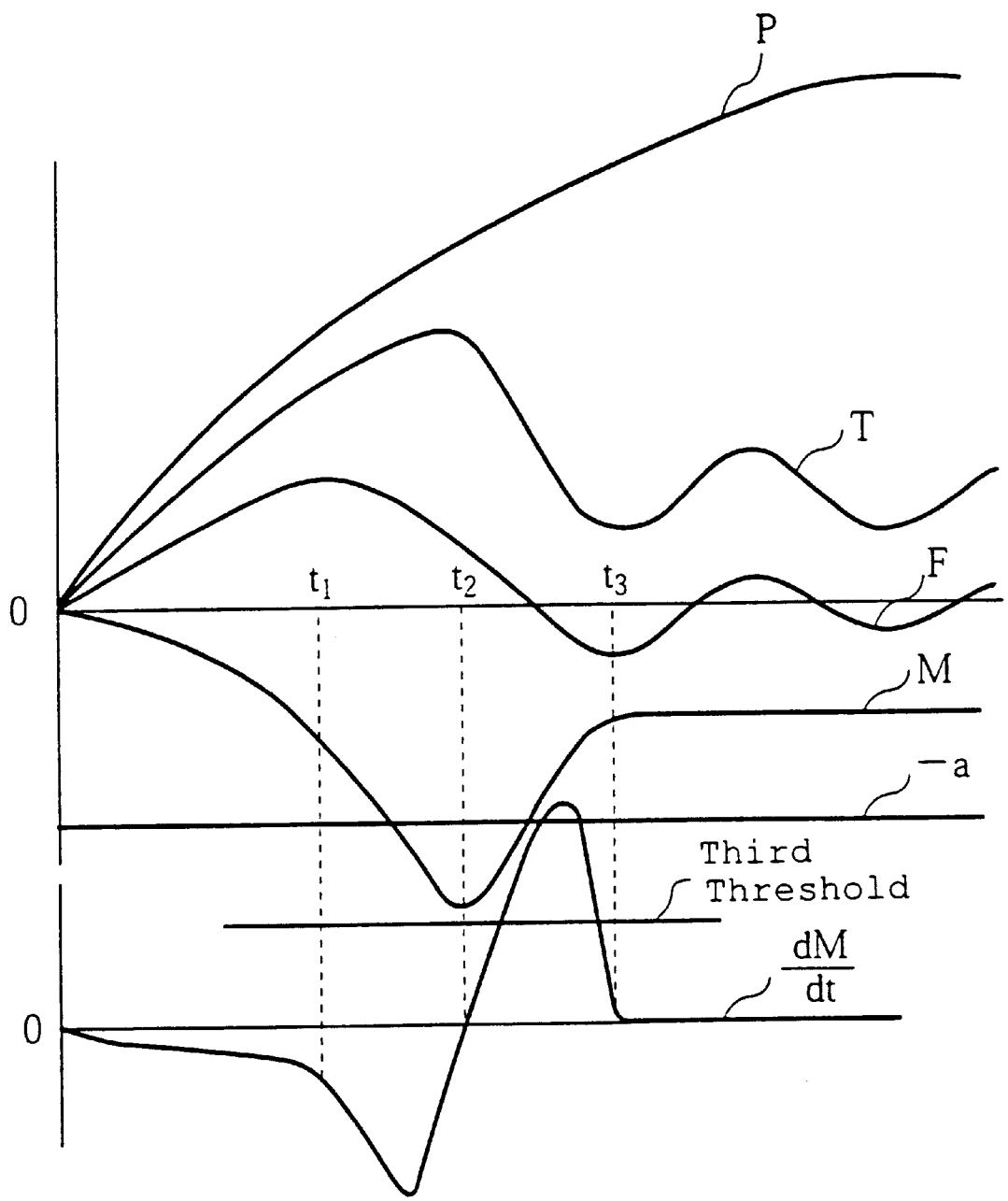
FIG. 5 is a graph showing signal wave forms at different points in the ABS apparatus according to the embodiment of the present invention.

FIG. 5 shows wave forms illustrating changes in various parameters from a time when there is a quick braking action in a running car to a time a wheel locks. As clearly shown in FIG. 5, when the braking operation is started, the road frictional force F and the braking torque T increase almost linearly with increase in the brake fluid pressure P, as far as there is sufficient frictional force between the road and the wheel ($0 \sim t_1$). During this phase, the differential parameter M has a generally constant gradient.

However, when the frictional force acting from the road to the wheel approaches to a limit, the road frictional force F keeps increasing but at a slower rate whereas the braking torque T keeps increasing with the increase in the brake fluid pressure P. When the brake fluid pressure P reaches a point to match the limit of the frictional force, the road frictional force begins to drop sharply. When the wheel is locked, the braking torque T begins to decrease as sharply as the road frictional force F. For these reasons, during the above phase ($t_1 \sim t_2$) the differential parameter M begins decreasing sharply with the decreasing rate of growth in the road frictional force F, and becomes minimum when the braking torque T peaks. Then, the differential parameter M begins to increase in inverse proportion to the decreasing braking torque T, and finally becomes constant (at $t_3$ and thereafter).

In general, the braking torque T is much greater than the road frictional force F. For this reason, the road frictional force F as detected in common procedures generally includes a fairly large amount of crosstalk component of the braking torque T. Detecting a pure road friction is therefore extremely difficult. Reference is now made to an approximate motion equation (1) shown below, where $F_{pure}$ is the pure road frictional force, t is the crosstalk component included in the road frictional force F detected by the road frictional force sensor 15. The crosstalk component t is proportional to the braking torque T. Therefore, t/T can be defined as a constant. As a result, if the differential parameter M=F−T is used in the control, it becomes possible to perform the control without being affected by the crosstalk component of the braking torque T. Further, it is considered that movement of the differential parameter M can be approximated to the behavior of a wheel turning angular velocity d$\omega$/dt. As a further note for the equation (1), I represents the wheel moment of inertia, $\omega$ represents wheel turning angular velocity, whereas each of $K_1$ and $K_2$ is a constant of proportion.

$$I\frac{d\omega}{dt} = F_{pure} - K_1 T \qquad (1)$$
$$= (F - t) - K_1 T$$
$$= F - K_1 T\left(1 + \frac{1}{K_1} \cdot \frac{t}{T}\right)$$
$$= F - K_2 T$$

With the above understanding, once a braking operation starts, the differential parameter M is constantly calculated by the M calculating means 21 based on the road frictional force F from the road frictional force sensor 15 and the braking torque T from the braking torque sensor 16. Results of the calculation are constantly fed to the solenoid controlling means 23. On the other hand, the solenoid controlling means 23 constantly monitors the differential parameter M once the braking operation starts. When the value of the differential parameter M has decreased to the value of −a supplied by the −a calculating means 21, the solenoid controlling means 23 judges that the wheel will soon be locked, and therefore starts reducing the braking fluid pressure P at this point. By using this point as the start timing of the pressure reducing control in the ABS control cycle, the wheel is prevented from being locked. Note should be made that −a shown in FIG. 5 is the first threshold, representing a critical boundary of the braking force in the braking control.

Now, the critical boundary represents a critical boundary of the road friction coefficient μ, and the road friction coefficient μ changes concurrently with changes in road conditions and car speed. This means that −a as representing the critical boundary must also be changed accordingly, which will be described later in more detail. It should also be understood that the best braking force can be obtained by maintaining the brake fluid pressure so that the differential parameter M always stays close to −a.

When the brake fluid pressure P is increased, the braking torque T increases with a certain delay in the braking system, and then the road frictional force F increases with a certain delay in transmission. Referring again to FIG. 5, a left-hand region of the first peak in the road frictional force F is generally called the stable region, whereas a right-hand region is called the unstable region. In this unstable region, there can be a situation so called over slipping situation, which is a situation right before the wheel is locked, i.e. a situation in which the wheel is turning yet the turning speed is decreasing very sharply. The locking of the wheel can be reliably prevented by decreasing the brake fluid pressure P before the over slipping situation becomes evident. The over slipping situation can become evident however, when road conditions change abruptly for example, and controlling in such a situation will be described later.

Figure 6:
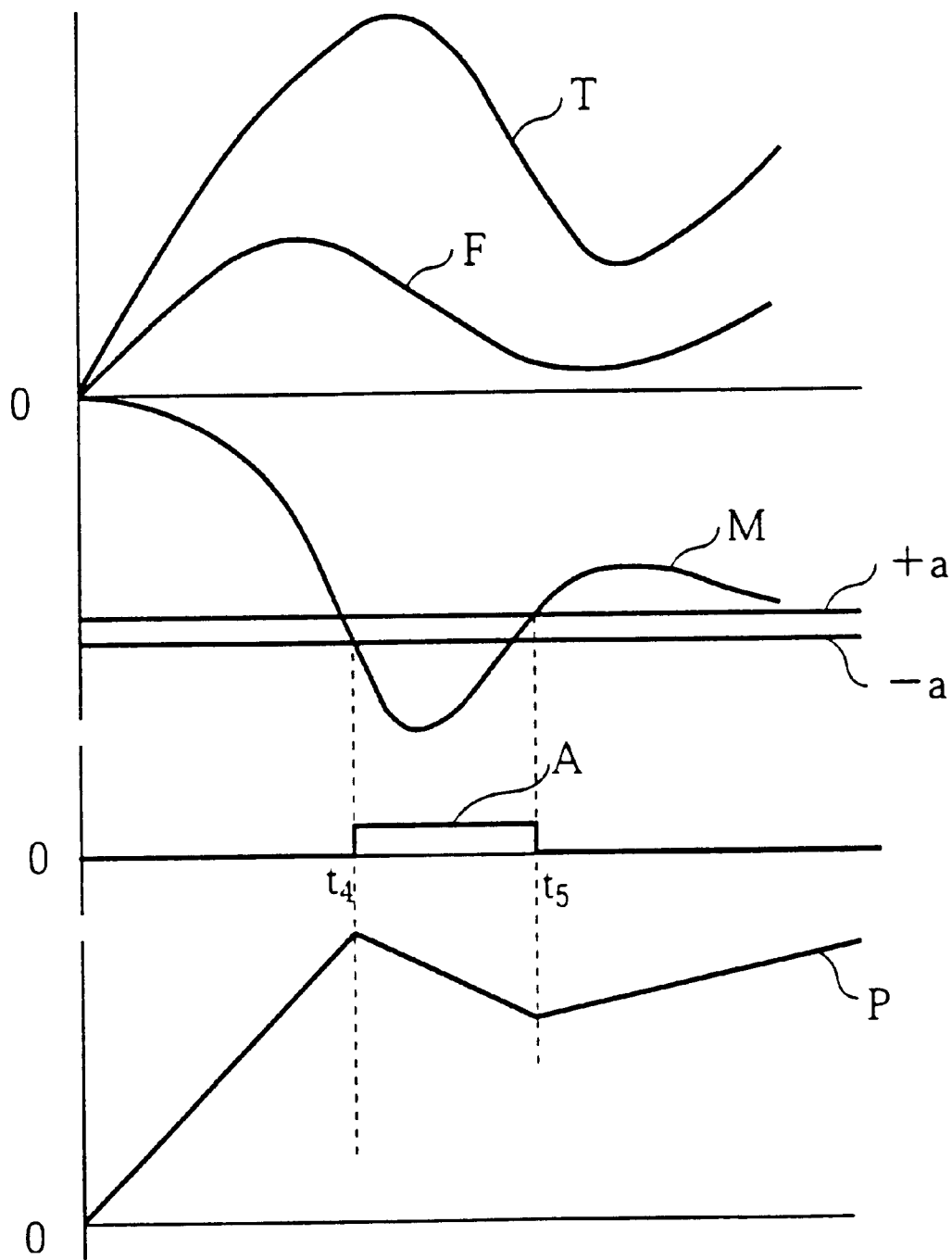
FIG. 6 is a graph showing signal wave forms at different points in the ABS apparatus according to the embodiment of the present invention.

Referring back to the phase in which the brake fluid pressure P is being increased or maintained, the differential parameter M moves swiftly toward the negative region. During this phase, while the differential parameter M is moving toward the unstable region, the differential parameter M is constantly compared with −a as the critical boundary, i.e. a pressure reducing baseline threshold. The comparison yields a brake fluid pressure decreasing signal A as shown in FIG. 6, and a starting point ($t_4$) of the brake fluid pressure decreasing signal A is used as the start timing for the pressure reducing control. In order to prevent unnecessary reduction in the brake fluid pressure in the stable region, −a must have a value slightly larger in the negative direction than the differential parameter M based on the largest currently existing road friction coefficient μ.

A period of time in which the brake fluid pressure P is being reduced is a time when the car has gone too far into the unstable region, with the differential parameter M being lower than −a, i.e. being excessively grown toward the negative direction. With the decrease in the brake fluid pressure P however, the differential parameter M begins to rise. During this rise, the differential parameter M is compared with the value of +a which represents a pressure raising baseline threshold, or the second threshold, and at a point ($t_5$) where the differential parameter M has come back to the second threshold, it is judged that sufficient reduction has been made to brake fluid pressure P and the wheel has begun re-accelerated. Thus, the pressure reducing control is stopped, and is replaced by the step of slowly increasing the brake fluid pressure P or gradually increasing the brake fluid pressure P based on a pulse step technology. At this point, +a must be generally the same or slightly above −a, the position being dependent upon −a. Pressure reduction above +a is useless, or counterproductive rather, only increasing a braking distance.

Generally, the road frictional force F and the road friction coefficient μ vary depending on a type of road the car is running on, conditional changes such as from dry asphalt to wet asphalt, and depending on changes in the moment of inertia resulting from change in car speed or a selected drive mode of the car's drive train. The prior art ABS apparatus uses a rate of slip or a rate of wheel velocity reduction as a main parameter for varying a value from which the stable limit of the wheel is detected. However, the gear type speed sensor used in the prior art ABS apparatus has a problem of slower response when the car speed decreases. Another problem is that the rate of slip must be calculated from an estimated car speed based on the wheel turning speed. These problems reduce reliability of control.

Figure 7:
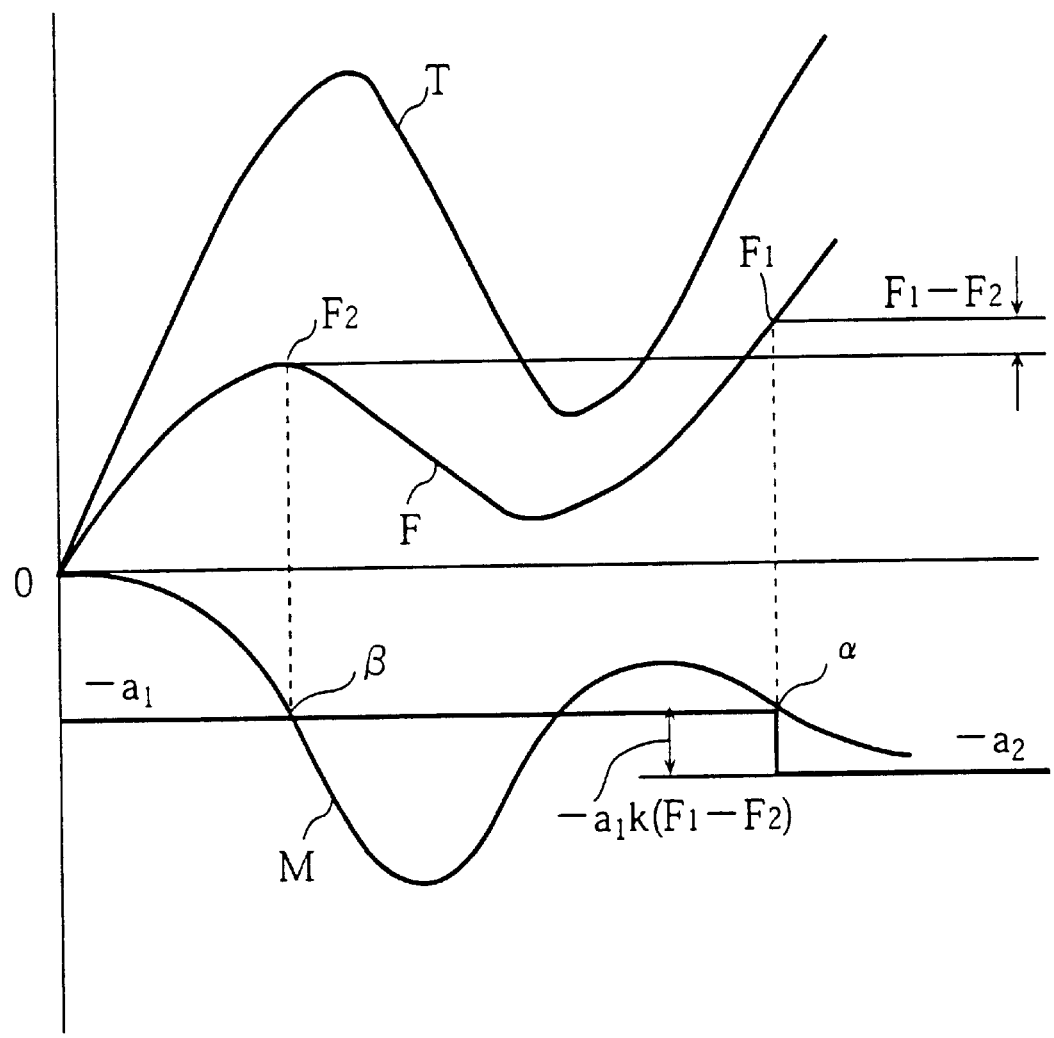
FIG. 7 is a graph showing signal we have forms at different points in the ABS apparatus according to the embodiment of the present invention.

In order to solve this problem, as shown in FIG. 7, comparison is made between a road frictional force F obtained at a point α0 where the differential parameter M crosses −a and a road frictional force F obtained at a point β where the differential parameter M crosses −a in the previous control cycle, and then the value of −a is reduced by the difference between the two values of the road frictional force, i.e. the wheel stability limit is lowered. By performing the above cycle of operations continuously from the time the braking operation is started, −a can be changed continuously or in a stepped manner, thereby making possible to control −a in accordance with changes in the moment of inertia resulting from the changing speed of the car.

Further, by changing −a gradually or in a stepped manner in response to changing gradient of the gravitational acceleration G, it becomes possible to control −a in accordance with changes in road condition.

Specifically, varying the first threshold −a concurrently with changing conditions means that the second threshold +a is also varied concurrently, making possible a real-time control on the timings of the pressure reduction start and pressure reduction stop free from the shortcomings persistent to the gear type wheel velocity sensor used in the prior art ABS apparatus, responding more truly to changes in the moment of inertia resulting from change in car speed or a selected drive mode of the car's drive train.

Here, description will be made about the control at the time of over slipping situation as mentioned earlier. Once the over slipping situation develops, there is a change in governing force acting on the wheel. Specifically, the force acting on the wheel changes from those from the brake fluid pressure or the friction currently existing between the road and tire, to a force based on a coefficient of dynamic friction, i.e. a force of inertia. Hence, it is assumed that the wheel begins to be freed from the braking torque T or the road frictional force F, with both of the braking torque T and the road frictional force F decreasing sharply in spite of an increase in the brake fluid pressure. At this particular point, the parameter M, which was moving toward negative, begins increasing sharply at an accelerating rate, and the increase continues until the wheel is locked, at which point the parameter M converges to a constant value.

With this behavior of the parameter M, the point at which the parameters M begins the sharp increase can be defined as a limit of stable steering. If the increasing trend in M continues, the wheel can be judged as being in the over slipping situation in which stable steering is not possible. Thus, the point of steering limit can be detected by differentiated value of the parameter M, i.e. a rate of change dM/dt. Specifically, as shown in FIG. 5, the third threshold is set on the positive side of a curve given by the rate of change dM/dt, and a point when the gradient of the differential parameter M, i.e. dM/dt exceeds this third threshold is detected as the limit of the steering control where current control is stopped and replaced by the braking pressure reducing control.

A period of the braking pressure reducing control is a period when the wheel velocity comes back from the unstable region to the stable region. In the unstable region, the differentiated value of the differential parameter M, i.e. the rate of change dM/dt moves wildly, but when the wheel velocity comes closer to the stable region, the movement becomes smaller and the dM/dt finally converges to a constant value.

With this behavioral pattern, the rate of change dM/dt is constantly monitored from the time when the pressure reducing operation is started, and real-time calculation is continued for monitoring the range of movement. When the movement of dM/dt has dropped to within a predetermined range, it is judged that the wheel has recovered from the over slipping situation and is sufficiently stable, being in the stable region, i.e. the timing for stopping the pressure reducing operation has come.

It should be noted that a value of the differential parameter M at a time when an over slipping situation has started can also be used for determining a road condition, or getting a rough estimate of road U. Description will now be made for a method for determining the road condition using the differential parameter M obtained right after an over slipping situation has developed.

Generally, the road friction coefficient $\mu$ as existing between the road and tire is not constant as far as the car is running, but is constantly changing, needless to say. Among others, change in road conditions is the major factor to the change in the road friction coefficient $\mu$.

An assumption is made now that a car which is running on dry asphalt now moves in a very slippery surface (such as wet steel plate or other surfaces having a very low $\mu$). Specifically, the car is now in a jumping-down situation where the change from over slipping to locking proceeds very quickly, and at the same time shift from the stable region to the unstable region proceeds very quickly. Accordingly, the differentiated value of the differential parameter M, i.e. the rate of change dM/dt moves more wildly in a much wider range than normal. Therefore, a jumping-down situation can be judged to have developed if an initial amount of movement of dM/dt right after an over slipping situation has reached the fourth threshold which is sufficiently greater than the third threshold, and at this point the value of the first threshold should be set to the optimum predetermined value, or more specifically, the value which is pre-selected as the value for the low $\mu$ condition.

With exception of the jumping-down situation, the road condition can be estimated much more easily from the value of the differential parameter M obtained right after an over slipping has developed. Specifically, an absolute value of the differential parameter M right after the over slipping situation has developed is compared with a norm which is a value sufficiently greater than the absolute value of −a predetermined for the low $\mu$ condition. If the absolute value of the parameter M is smaller, then it can be assumed that the road condition is similar to the low $\mu$ condition. Likewise, if the absolute value of the parameter M is greater, then it can be assumed that the road condition is similar to the middle $\mu$ condition. This is clear from the fact that the parameter M comprises the braking torque T and the road frictional force F.

From a view point of performing control, an over slipping situation is a result of the first threshold −a mismatched, by a floating technique for example, with a concurrent road friction coefficient $\mu$ currently existing between the road and the tire. More specifically, an over slipping situation develops when −a has a value lower than the optimum value for the road friction coefficient $\mu$.

The first threshold −a is the critical boundary of braking force in the braking operation, which represents the critical boundary of the road friction $\mu$. Therefore, an over slipping situation can be corrected by giving the first threshold −a a value close to the optimum value that matches the road friction coefficient $\mu$. According to the present embodiment, three absolute values are selected by experience for the first threshold −a respectively for a high $\mu$ road, a middle $\mu$ road and a low $\mu$ road, and are stored in the ROM 13. The high $\mu$ road refers to a dry asphalt road, and the middle $\mu$ road refers to a wet asphalt road while the low $\mu$ road refers to a smooth slippery surface such as a wet plate of steel or linoleum.

If the absolute value of the differential parameter M right after an over slipping situation has developed is not greater than the norm value which is slightly larger than the absolute value of −a for the low $\mu$ road, the absolute value of −a should be replaced with the value for the low $\mu$ road: If grater, comparison must be made further with the value for the middle $\mu$ road, and if the parameter M has the absolute value not greater than the value for the middle $\mu$ road, then the absolute value of −a should be replaced with an average of the current value and the value for the low $\mu$ road: If the parameter M has the absolute value greater than the value for the middle $\mu$ road, then the absolute value of −a should be replaced with an average of the current value and the value for the middle $\mu$ road. This is how to select the absolute value for the first threshold −a to be used right after recovering from an over slipping situation. Needless to say the first threshold value −a should be given the same sign, positive or negative, as of the differential parameter M. If M is defined as M=F−T, the differential parameter M usually has a negative value, and therefore it may be assumed that the first threshold −a also has a negative value.

Figure 8:
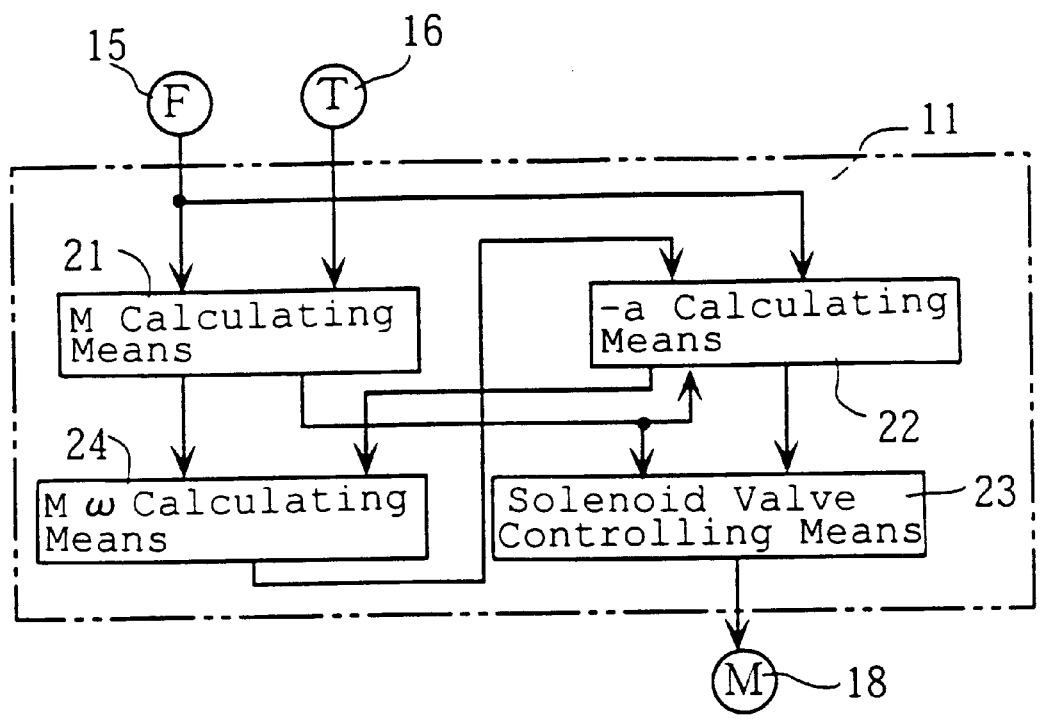
FIG. 8 is a block diagram showing a virtual circuitry relationship created by a CPU of an ABS apparatus according to another embodiment of the present invention.

FIG. 8 is a block diagram showing a virtual circuitry relationships created by the CPU 11 in another embodiment of the present invention. According to this particular embodiment, the −a calculating means 22 varies −a according to a difference in a wheel velocity parameter M$\omega$ obtained in a predetermined interval, instead of varying −a according to the changing gradient in the locus of the gravitational acceleration G. The present embodiment is the same as the previous embodiment represented by the block diagram shown in FIG. 4 in that the value of −a is also varied according to the amount of change in the road frictional force F. However, according to the present embodiment, an M$\omega$ calculating means 24 is provided for calculating the value of wheel velocity parameter M$\omega$ by integrating a difference between a value of the differential parameter M supplied by the M calculating means 21 and a value proportional to −a supplied by the −a calculating means 22. Otherwise, the present embodiment is the same as the previous embodiment shown in the block diagram in FIG. 4. The present embodiment is advantageous in that the gravitational acceleration sensor 17 can be eliminated.

Now, theoretic discussion will be made for reasons why the above arrangement can provide superior ABS control.

As has been described earlier, the differential parameter M can be approximated by the equation (1) to the behavior of the wheel turning angular velocity acceleration d$\omega$/dt. Thus, by using a following equation (2), an integrated value M$\omega$ of the differential parameter M can be approximated to behavior of the wheel velocity $V_w$. A variable R shown in the equation (2) represents an effective radius of the wheel. A following equation (3) shows a relationship between the integrated value M$\omega$ of the differential parameter M and the wheel velocity $V_w$, where each of k and C is a constant.

Figure 9:
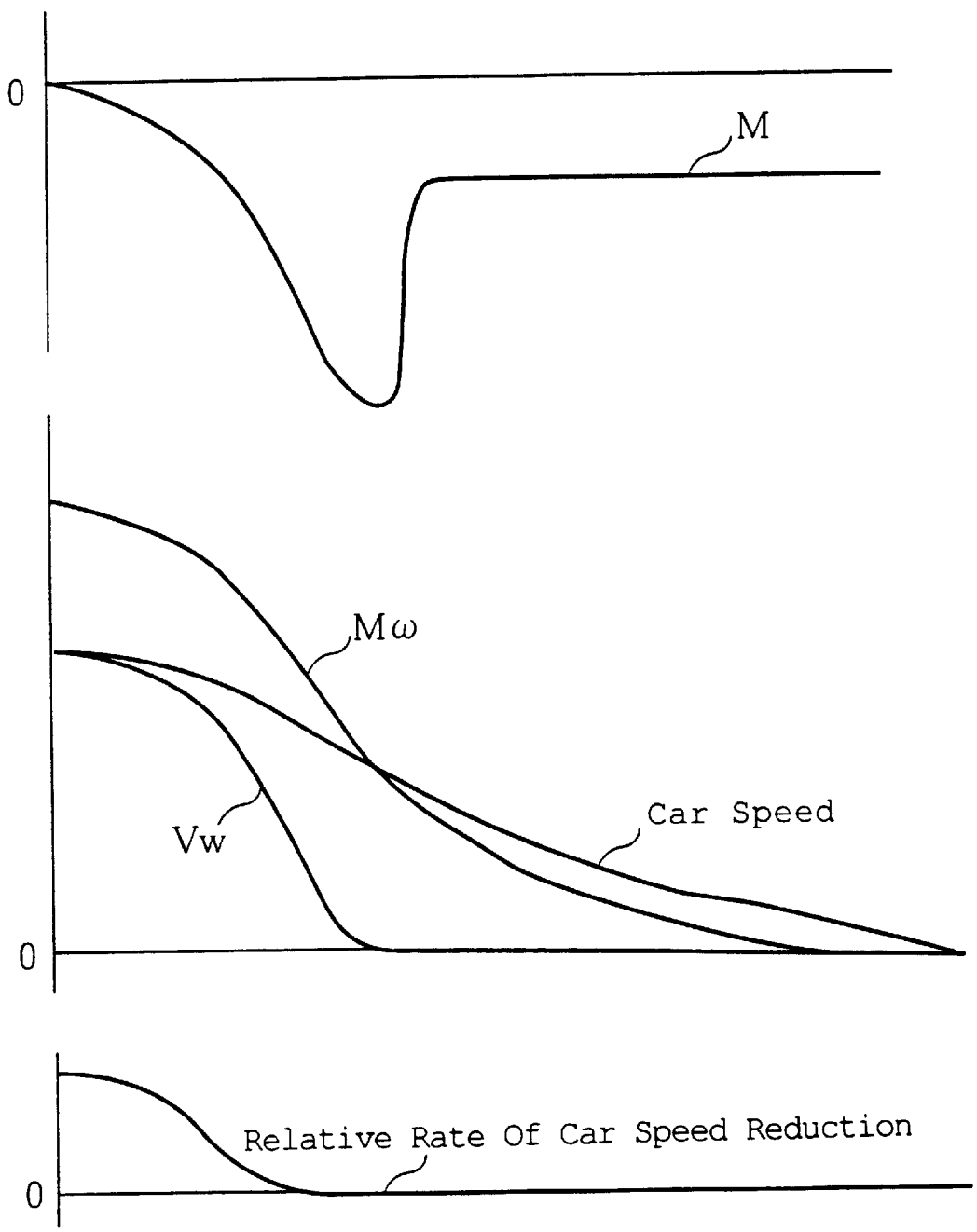
FIG. 9 is a graph showing signal wave forms at different points in an ABS apparatus according to the above embodiment of the present invention.

Further, FIG. 9 shows a behavior of the integrated value Mω approximated to the wheel velocity $V_w$ during a braking operation.

$$R\omega = Vw \ldots (2)$$

$$Vw = \int R\frac{d\omega}{dt}dt \qquad (3)$$

$$= R\int \frac{d\omega}{dt}dt$$

$$\propto \frac{R}{I}\int M dt$$

$$= k(M\omega + C)$$

As shown in FIG. 9, The differential parameter M given by the equation M=F–T is always in the negative region whereas the wheel velocity $V_w$ becomes 0 when the wheel is locked. Hence, there must be means for correction so that the integrated value Mω is always an approximation to the wheel velocity $V_w$. It should be noted that during this period, a rate of relative speed reduction is constant because the wheel, which was under a force based on a coefficient of static friction, is now under a force based on a coefficient of dynamic friction.

Figure 10:
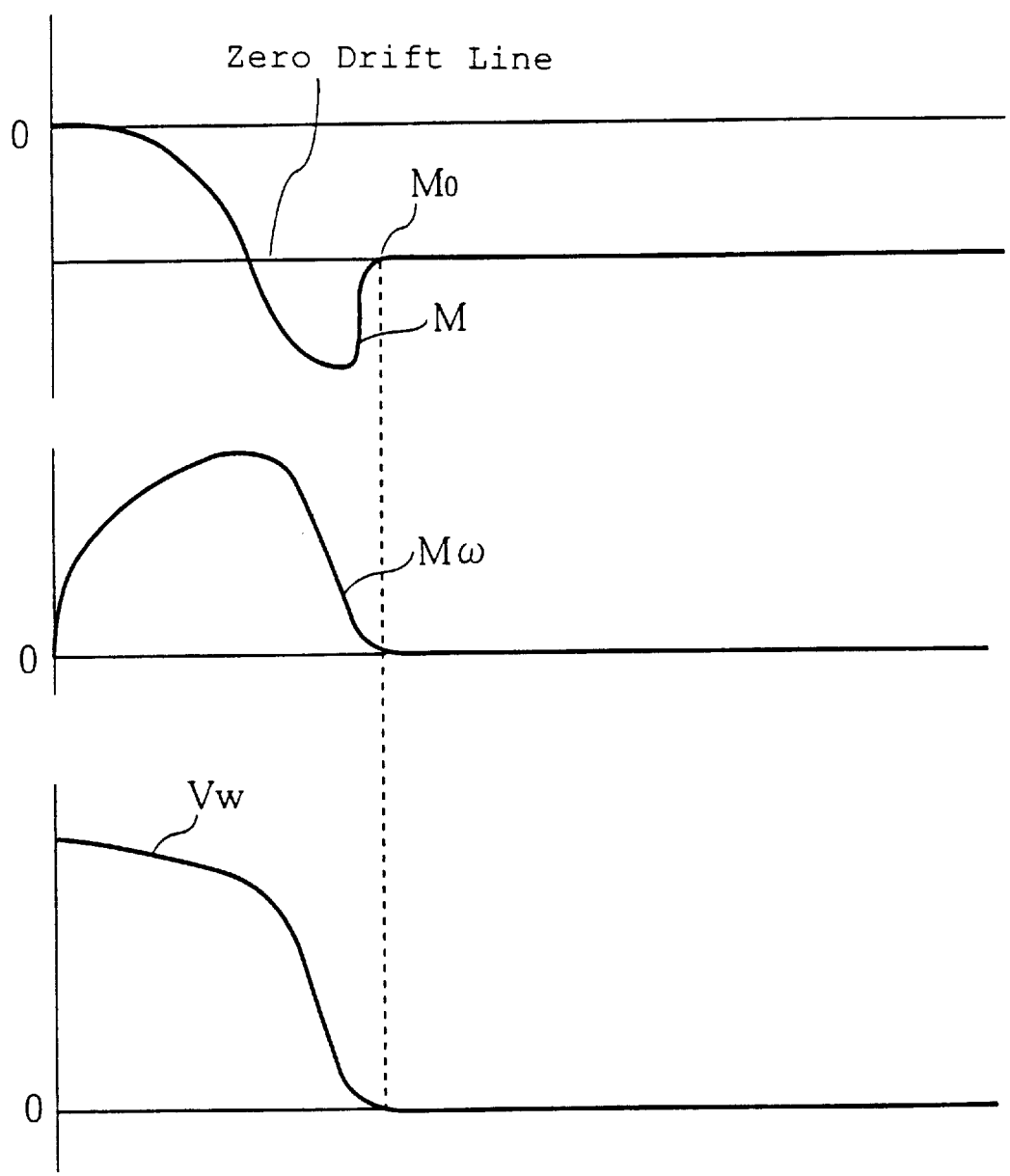
FIG. 10 is a graph showing signal wave forms at different points in the ABS apparatus according to the embodiment shown in FIG. 9.

Now, the correction for calculating the wheel velocity parameter Mω, can be made by utilizing the fact that the differential parameter M comes to a constant value when the wheel is locked, similarly to the rate of speed reduction as shown in FIG. 10. Specifically, a zero drift line having the same value as a value of the differential parameter $M_0$ while the wheel is locked, i.e. a straight line having a value proportional to –a, is used as a base line for the correction. With this zero drift line being the base line, the point of origin is shifted to the zero drift line. This operation makes possible to obtain the wheel velocity parameter Mω which has the same behavior as of the wheel velocity $V_w$ in actual braking control.

From the time when the braking operation is started to the time when the wheel is locked, there is a period in which the differential parameter M is in the positive region relative to the zero drift line. During this period, an amount of change in the wheel turning angular acceleration is minimal, and it is possible to judge that this period may be neglected in the ABS control as being in the stable region. Thus, this provides a reason for a judgment that there is no need for the ABS control during the period from right after the time when the braking operation is started to the time when the differential parameter M reaches the zero drift line.

Change in the road condition during the braking operation can be estimated from a value given by a two point differential expression of the wheel velocity parameter Mω which can be approximated to the wheel velocity $V_w$. The two point differential is a real time calculation of an amount of change in the wheel velocity parameter Mω in a given time period, which corresponds to an amount of change in the wheel velocity $V_w$.

An example is taken for a case when braking operation is being performed to the car running on changing road conditions such as from wet asphalt to dry asphalt. During a former part while the car is running on the wet asphalt, the friction coefficient μ on the road assumes a small value, and therefore –a must be set to a relatively small value. Thus, needless to say, the differential parameter M takes an accordingly small value, and the amount of change in the wheel velocity parameter Mω which corresponds to an integrated value of M is also small. However, when the car comes in the dry asphalt road, the friction coefficient μ then takes a large value, making possible to lower –a, and the amount of change in the wheel velocity parameter Mω increases accordingly. This singular point in the wheel velocity parameter Mω corresponds to a point of transition in the road condition at which the road friction coefficient μ changes drastically, making possible to set a new value for –a to match the new road condition.

Figure 11:
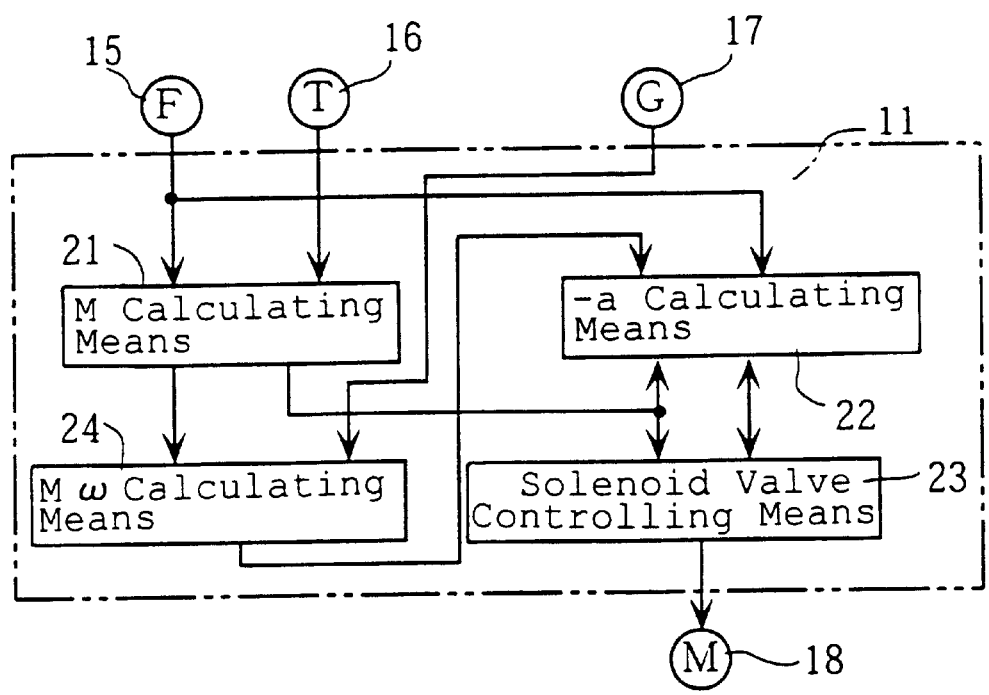
FIG. 11 is a block diagram showing a virtual circuitry relationship created by a CPU of an ABS apparatus according to still another embodiment of the present invention.

FIG. 11 is a block diagram showing a virtual circuitry relationships created by the CPU 11 in still another embodiment of the present invention. According to this embodiment, the Mω calculating means 24 calculates the wheel velocity parameter Mω by integrating a difference between the differential parameter M calculated by the M calculating means 21 and the gravitational acceleration G entered via the interface 14 by the gravitational acceleration sensor 17. Otherwise, all the other aspects of the present embodiment are the same as the previous embodiment shown in the block diagram in FIG. 8.

Now, theoretic discussion will be made for reasons why the above arrangement can provide superior ABS control.

Figure 12:
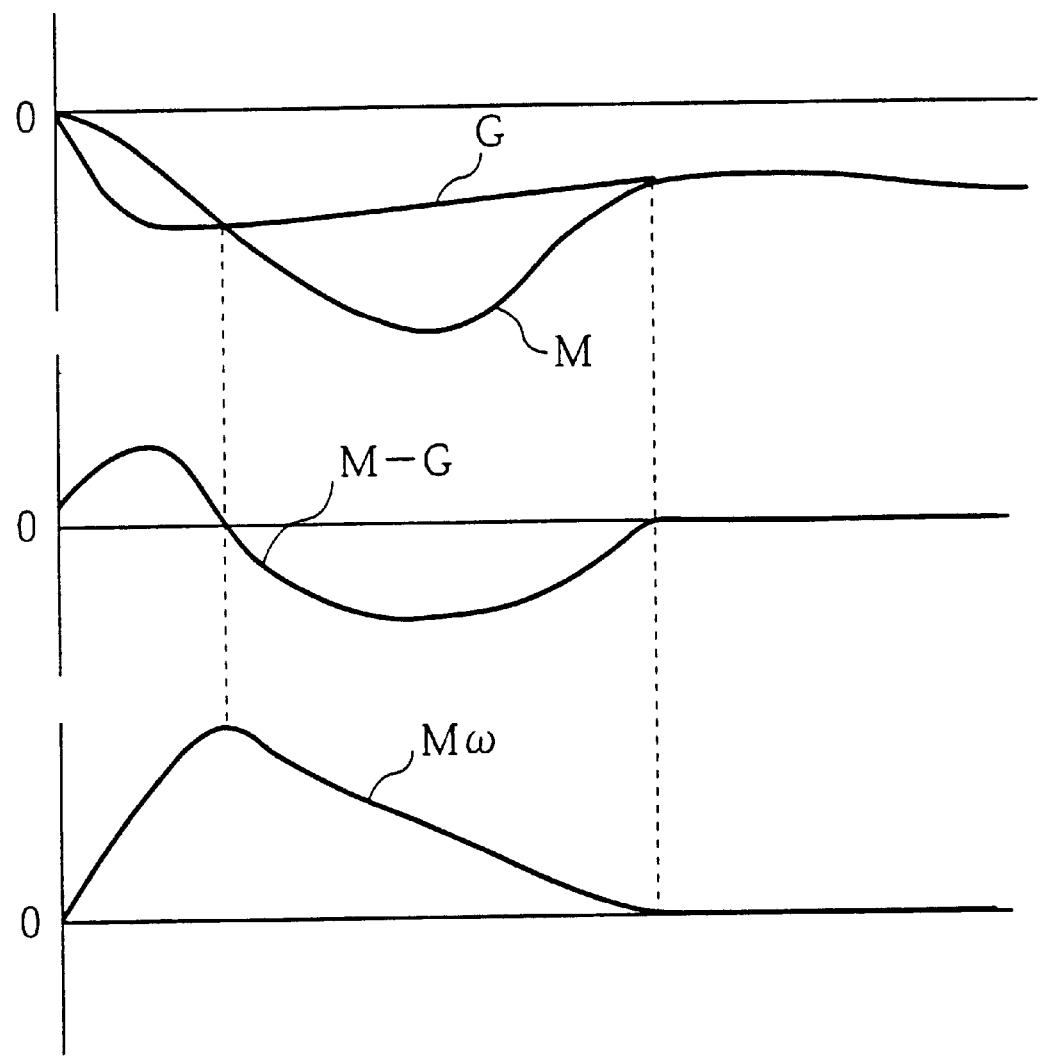
FIG. 12 is a graph showing signal wave forms at different points in the ABS apparatus according to the embodiment shown in FIG. 11.

As shown in FIG. 12 the wheel velocity parameter Mω is calculated by integrating M–G, where G represents the gravitational acceleration G from the gravitational acceleration sensor 17. In this arrangement, the integration is performed after correcting the differential parameter M by using the gravitational acceleration G as the zero drift line. The wheel velocity parameter Mω obtained as above simulates behavior of the wheel velocity $V_w$ during an actual braking control operation, making possible to appropriately vary the first threshold –a according to change in road condition.

According to each of the embodiments so far described, the judgment that the wheel has been sufficiently out of the over slipping situation is made and the brake fluid pressure reducing operation is stopped when the movement of dM/dt, i.e. the rate of change in the differential parameter M, has dropped to within a predetermined range. Alternatively, the pressure reducing operation may be stopped when the movement of dM/dt has dropped to within a predetermined range continually for a plurality of times.

With such an arrangement, it becomes possible to reduce errors in detecting if the wheel over slipping situation has been eliminated.

Figure 13:
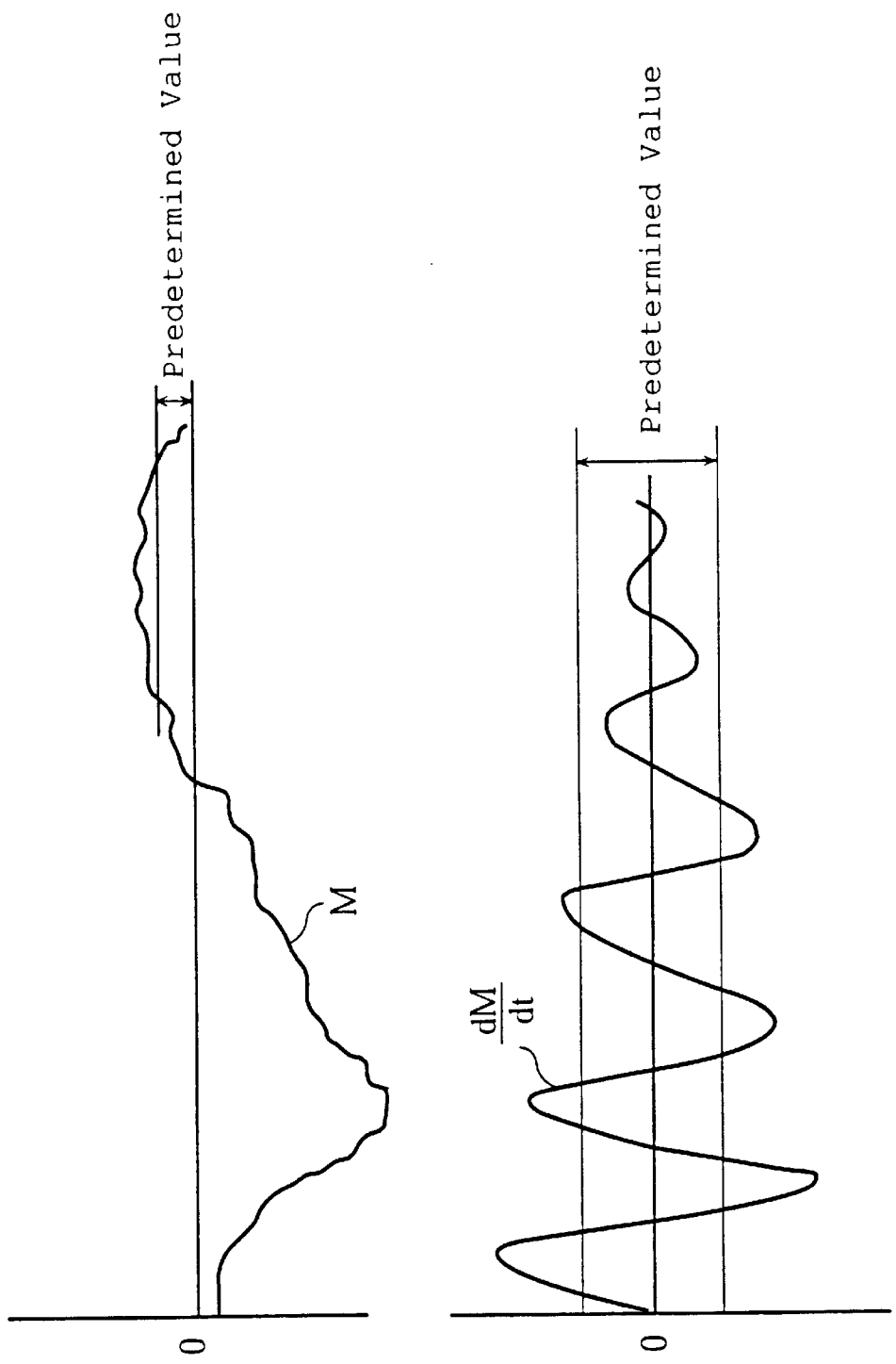
FIG. 13 is a graph showing wave forms of a differential parameter and a rate of change of the differential parameter right after an over slip has developed.

Further, as shown in FIG. 13, the pressure reducing operation may be stopped when the movement of dM/dt has dropped to within a predetermined range and if the differential parameter M is greater than a predetermined value.

With such an arrangement, it becomes possible to further reduce the errors in detecting if the wheel over slipping situation has been eliminated. Specifically, if a change in the road friction coefficient μ is relatively small, the movement of dM/dt is also relatively small. In such a situation, there is a greater chance of an error if judgment to the question whether the over slipping situation is eliminated depends solely on the rate of change dM/dt, and therefore it is advantageous to check the value of differential parameter M as well.

Still further, the pressure reducing operation may be stopped when the movement of dM/dt has dropped to within a predetermined range continually for a plurality of times and if the differential parameter M is greater than a predetermined value.

With such an arrangement, it becomes possible to further reduce the errors in detecting if the wheel over slipping situation has been eliminated.

As described above, according to each of the embodiments using the circuitry concepts shown in FIGS. 4, 8, and 11, the timing for stopping the pressure reducing operation is judged by using the differential parameter M based on the road friction information which reflects the road frictional force F and the braking torque information which reflects the braking torque T. Thus, differing from the prior art control using the gear which turns with the wheel, it becomes possible to always perform accurate control regardless of conditions such as the car speed. Further, the differential parameter M is a parameter which does not contain any crosstalk component of the braking torque T included in the road frictional force F. This further increases accuracy in the stopping control of the pressure reduction.

Further, the first threshold is varied according to the gradient of gravitational acceleration curve which reflects the gravitational acceleration G, or according to the two point difference in the wheel velocity parameter M$\omega$. This makes possible to quickly and accurately respond to changing situation of the road, increasing further the accuracy of the control Still further, the first threshold is varied according to the difference between the road friction information at the starting time of current pressure reducing operation and the road friction information at the starting time of previous pressure reducing operation. As a result, it becomes possible to quickly and accurately respond to changing moment of inertia resulting from change in car speed, increasing further the accuracy of the control.

Still further, development of an over slipping situation is judged by using the rate of change dM/dt of the differential parameter M, and the braking fluid pressure is reduced accordingly. This makes possible to better deal with the over slipping situations caused by an abrupt change in road conditions, reliably preventing the wheel from being locked.

Still further, the elimination of the over slipping situation is judged by using the rate of change dM/dt of the differential parameter M, and the pressure reducing operation to the brake fluid is stopped accordingly. This makes possible to better prevent useless reduction in the brake fluid pressure after the over slipping situation is eliminated, making possible to reduce the braking distance.

Still further, the first threshold is given a new value close to the optimum value when an over slipping situation or a jumping down situation has developed. This makes possible to respond better to an abrupt change in road conditions.

Figure 14:
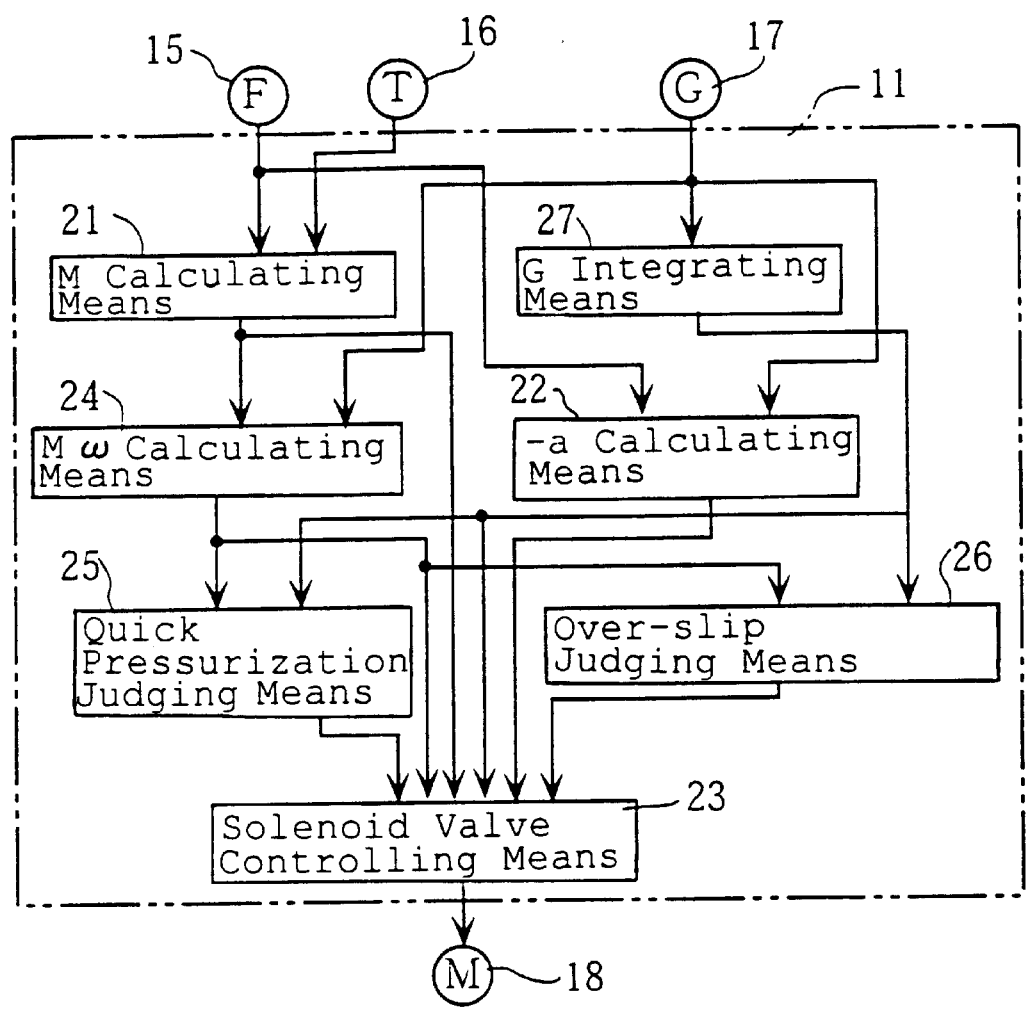
FIG. 14 is a block diagram showing a virtual circuitry relationship created by a CPU of an ABS apparatus according to still another embodiment of the present invention.

FIG. 14 is a block diagram showing a virtual circuitry relationships created by the CPU 11 according to still another embodiment of the present invention. Specifically, the CPU 11 provides M calculating means 21, G integrating means 27, M $\omega$ calculating means 24, −a calculating means 22, quick pressurization judging means 25, over-slip judging means 26, and solenoid value controlling means 23. Each of these circuitry is realized by the CPU 11 in its execution of an ABS control program stored in the ROM 13 when a brake pedal of the car is depressed. Though not illustrated in the figure, the pressing of the brake pedal is judged by the CPU 11 according to detection signals from a sensor mounted to the brake pedal or from a sensor monitoring brake fluid pressure of the braking equipment.

The M calculating means 21 receives via the interface 14 a road frictional force information F from the road frictional force sensor 15, and a braking torque information T from the braking torque sensor 16 for calculating a differential parameter M=F−T.

The G integrating means 27 integrates the gravitational acceleration G based on a gravitational acceleration information G entered by the gravitational acceleration sensor 17 via the interface 14.

The M$\omega$ integrating means calculates a wheel velocity parameter M$\omega$ integrating M−G, based on the differential parameter information M from the M calculating means 21 and the gravitational acceleration information G from the gravitational acceleration sensor 1 entered via the interface 14.

The −a calculating means 22 receives via the interface 14 the road frictional force information F from the road frictional force sensor 15, and the gravitational acceleration information G from the gravitational acceleration sensor 17 for calculating −a as a first threshold. Specifically, the gravitational acceleration G is monitored at a predetermined time interval. A difference between a current gravitational acceleration value G and a previous gravitational acceleration value G is used for calculating a gradient of a locus of the gravitational acceleration G, and according to this gradient, −a is varied continuously or in a stepped manner. Further, the −a calculating means 22 also varies −a continuously or in a stepped manner according to a difference between a current road frictional force F at the time of current pressure reduction start and a previous road frictional force F at the time of previous pressure reduction start. It should be noted that an initial value of −a when the brake pedal begins being depressed is predetermined according to a standard peak value in the negative direction of the differential parameter M, and is stored in the ROM 13.

The quick pressurization judging means 25 detects a delay in stopping the pressure reducing operation based on the wheel velocity parameter M$\omega$ from the M$\omega$ calculating means 24 and the integrated value from the G integrating means 27, and generates a quick pressurization command signal. Specifically, a locus of the integrated value from the G integrating means 27 is translated so as to have a slightly greater value than the value of the wheel velocity parameter M$\omega$ at the starting time of the brake fluid pressure reducing operation.

The over-slip judging means 26 detects an over slipping situation based on information on the wheel speed parameter M $\omega$ from the M$\omega$ calculating means 24 and an integrated value from the G integrating means 27. Specifically, when the behavior of the wheel speed parameter M$\omega$ has changed from decreasing to increasing, if a gradient of locus given by the integrated value from the G integrating means 27 is not greater than a predetermined value, then the over-slip judging means 26 judges that the wheel is over slipping, and outputs an over-slip signal to the solenoid valve controlling means 23.

The solenoid valve controlling means 23 switches power supply to a solenoid of the solenoid valve 18 according to information on the differential parameter M from the M calculating means 21, wheel speed parameter M$\omega$ from the M$\omega$ calculating means 24, −a from the −a calculating means 22, integrated value from the G integrating means 27, quick pressurization command from the quick pressurization judging mans 25, and the over-slip signal from the over-slip judging means 26.

Next, a cycle of actions which takes place in the ABS apparatus is described. When a brake pedal is depressed, the solenoid controlling means 23 monitors the differential parameter M from the M calculating means 21 and −a from the −a calculating means 22. When the value of differential parameter M has decreased to −a, the solenoid controlling means 23 operates the solenoid valve 18 for reducing the brake fluid pressure. The solenoid controlling means 23 then monitors behavior of the wheel speed parameter M$\omega$ coming from the M$\omega$ calculating means and the integrated value of the G integrating means 27. The locus given by the integrated values coming from the G integrating means 27 is translated to share a value with the wheel speed parameter Mω at the time when the braking pressure reducing operating is started. This translated curve is used as a reference. Specifically, after the braking pressure reducing operation has been started, when the parameter Mω crosses the reference line, then the solenoid valve controlling means 23 controls the solenoid valve 18 to stop the pressure reducing operation. The solenoid controlling means 23 then repeats a cycle of increasing the pressure for 10 mm second and maintaining the pressure for 40 mm second for example, gradually increasing the brake fluid pressure.

The solenoid controlling means 23 keeps monitoring the differential parameter M from the M calculating means 21, and calculates a value for +a so that +a has the same value as −a or a slightly larger absolute value of −a. This value of +a is used as a second threshold. Specifically, after the braking pressure reducing operation is started, the solenoid controlling means 23 checks to see a time point when the value of differential parameter M reaches the second threshold. At this time point, if a predetermined minimum pressure reducing period is already passed and the pressure reducing operation is not stopped yet, then the solenoid controlling means 23 stops the braking pressure reducing operation. In other words, judgment on stopping the braking pressure reducing operation based on the wheel velocity parameter Mω and judgment on stopping the braking pressure reducing operation based on the differential parameter M are performed concurrently for reliably preventing an error in judging on the stop timing of the pressure reducing operation.

The above cycle of the decreasing control and increasing control of the brake fluids pressure is repeated until the car comes to a complete stop.

During the above control cycle, the −a calculating means 22 updates −a according to gradient information on the gravitational acceleration G. Specifically, the gradient in the gravitational acceleration G takes a large value on a road having a large road friction coefficient μ, and a small value on a road having a small road friction coefficient μ. Thus, by varying the value of the first threshold, i.e. −a, based on the road condition, timing to start and stop the braking pressure reducing operation is varied.

Further, the −a calculating means 22 updates −a based on a difference in the road frictional force F found at each cycle of pressure decreasing control. Specifically, the difference between the current frictional force F and the previous frictional force F is multiplied by a predetermined coefficient. The obtained result of the above calculation is then multiplied by the previous value of −a, and the result is subtracted from the previous value of −a to give a current value of −a. In other words, −a is varied according to variation in the moment of inertia resulting from change in car speed.

On the other hand, if the pressure reducing operation is stopped at a delayed timing, the wheel velocity parameter M ω takes an excessively large value. This behavioral pattern is utilized by the quick pressurization judging means 25 for detecting the delay in stopping the pressure reducing operation, and for outputting the quick pressurization command to the solenoid valve controlling means 23. The solenoid valve controlling means 23 then quickly increases the braking pressure until the wheel velocity parameter Mω takes a value not greater than the quick pressurization judging line, when the quick pressurization judging means 25 stops outputting the quick pressurization signal. The solenoid controlling means 23 then starts the cycle of gradually increasing the braking pressure by controlling the solenoid valve 18.

If an over slipping situation is present, the locus given by the integrated values of the gravitational acceleration G has a small gradient when the behavior of the wheel velocity parameter Mω turns from decreasing to increasing. This behavioral pattern is utilized by the over-slip judging means 26 for detecting the over slipping situation and for outputting the over-slip signal to the solenoid valve controlling means 27. The solenoid valve controlling means 27 then performs a predetermined control on the solenoid valve such as starting to decrease the braking pressure.

Now, theoretic discussion will be made for reasons why the above arrangement can provide superior ABS control. It should be noted however, that part of the discussion overlapping the previous discussions already made with reference to FIGS. 5, 6, 9 and 12 will not be repeated. It should also be noted that the judgment on stopping the braking pressure reducing operation is made concurrently with the control based on the wheel velocity parameter Mω.

Figure 15:
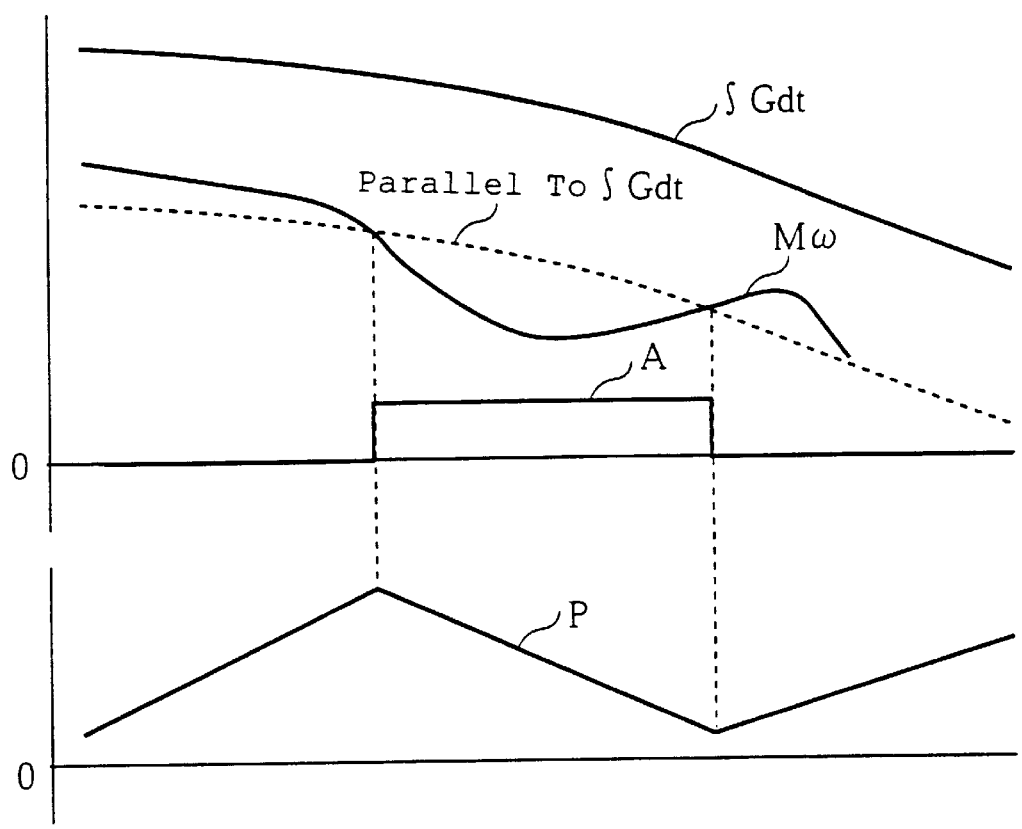
FIG. 15 is a graph showing signal wave forms at different points in the ABS apparatus according to the embodiment shown in FIG. 14.

Reference is now made to FIG. 15. In order to use the wheel velocity parameter Mω for the judgment on stopping the pressure reducing operation, a reference line represented by a relative rate of car speed reduction given by an integral of the gravitational acceleration G is used. Specifically, a locus given by integrated values of the gravitational acceleration G is translated to have an intercept equal to the value of wheel velocity parameter Mω, and this translated line is used as the reference line. When the wheel velocity parameter Mω crosses the reference line, this cross point is judged as the time when the wheel velocity has sufficiently come back to the stable region and therefore the pressure reducing operation is stopped.

With the above method, control reference points are selected in a parameter which is pre-selected on experience, as in another method to be described later in which a straight line is set as a reference line by using a value assumed by the parameter Mω at a predetermined retrospective time point. Further, the reference line is set so that the reference points are given solely by behavioral change in the wheel velocity parameter Mω. This eliminates a problem in actual control that a huge number of reference points have to be checked, thereby making possible to easily perform a real-time control responding to changing road conditions.

Figure 16:
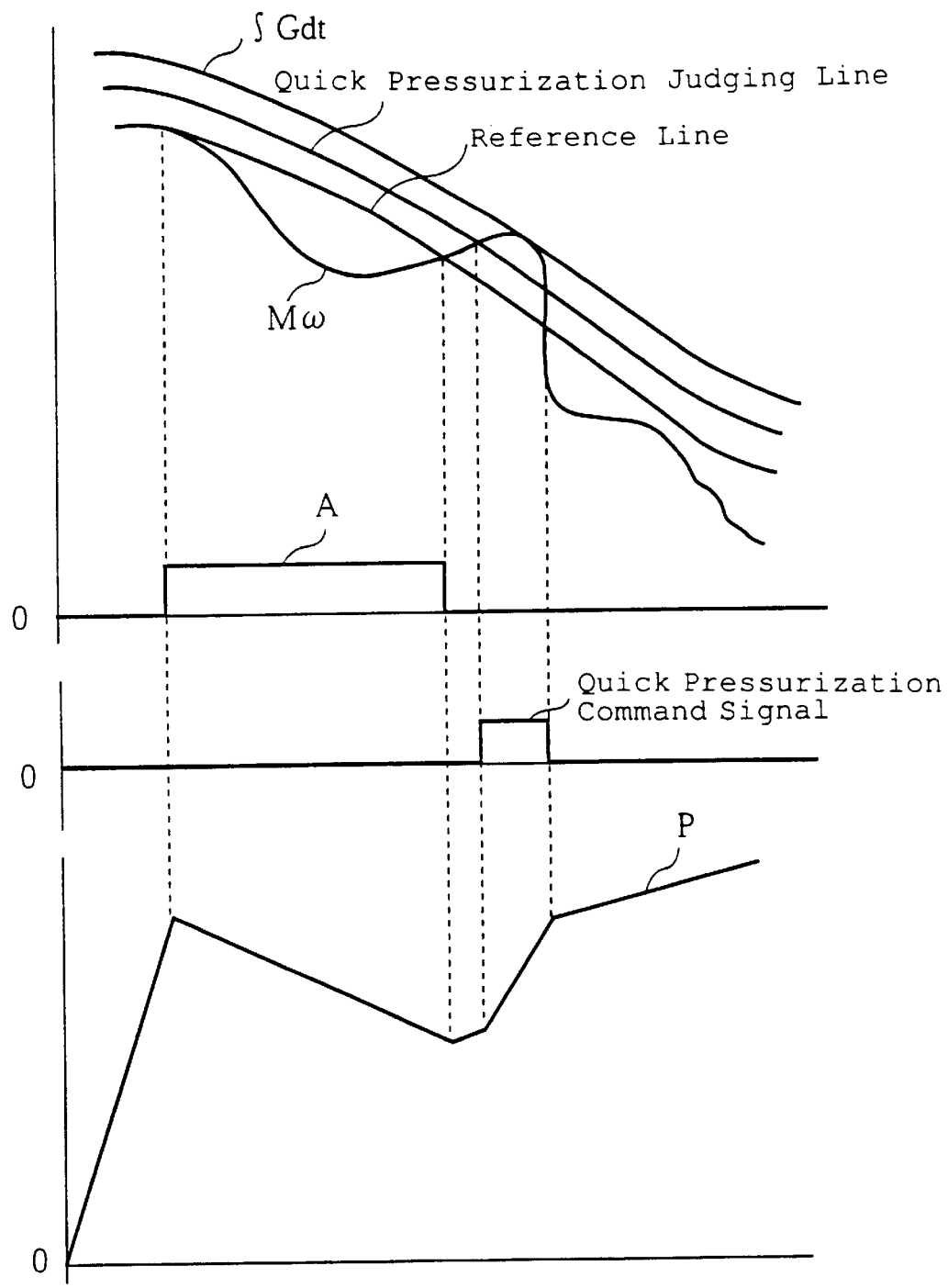
FIG. 16 is a graph showing signal wave forms at different points in the ABS apparatus according to the embodiment shown in FIG. 14.

During the pressure reducing operation, if the pressure is reduced excessively when the wheel velocity has already restored, the wheel velocity will have a tendency to become closer to the relative car speed, resulting in a loss in a rate of slip. During this period, as shown in FIG. 16, the wheel velocity parameter Mω exceeds the reference line, approaching the curve of relative rate of car speed reduction which is the locus given by the integral of the gravitational acceleration G. When such an excessive reduction is made in the braking pressure, the loss in slip rate will not be recovered by a normal gradual pressure increase conducted under the plus step control which generally follows the pressure reducing operation. In order to make up for a resulting loss in braking distance, the locus given by the integral of the gravitational acceleration G is translated to give another reference line, i.e. a quick pressurization judging line between the existing reference line and the locus given by the integral of the gravitational acceleration G. If the wheel velocity parameter Mω exceeds this quick pressurization judging line, then the normal gradual pressure increasing control is replaced by a quick pressure increasing control. This recovers the loss in the slip rate, and when the wheel velocity parameter Mω comes back to the quick pressurization judging line, the loss in slip rate is judged to have been recovered, and the normal gradual pressure increasing control takes over.

Figure 17:
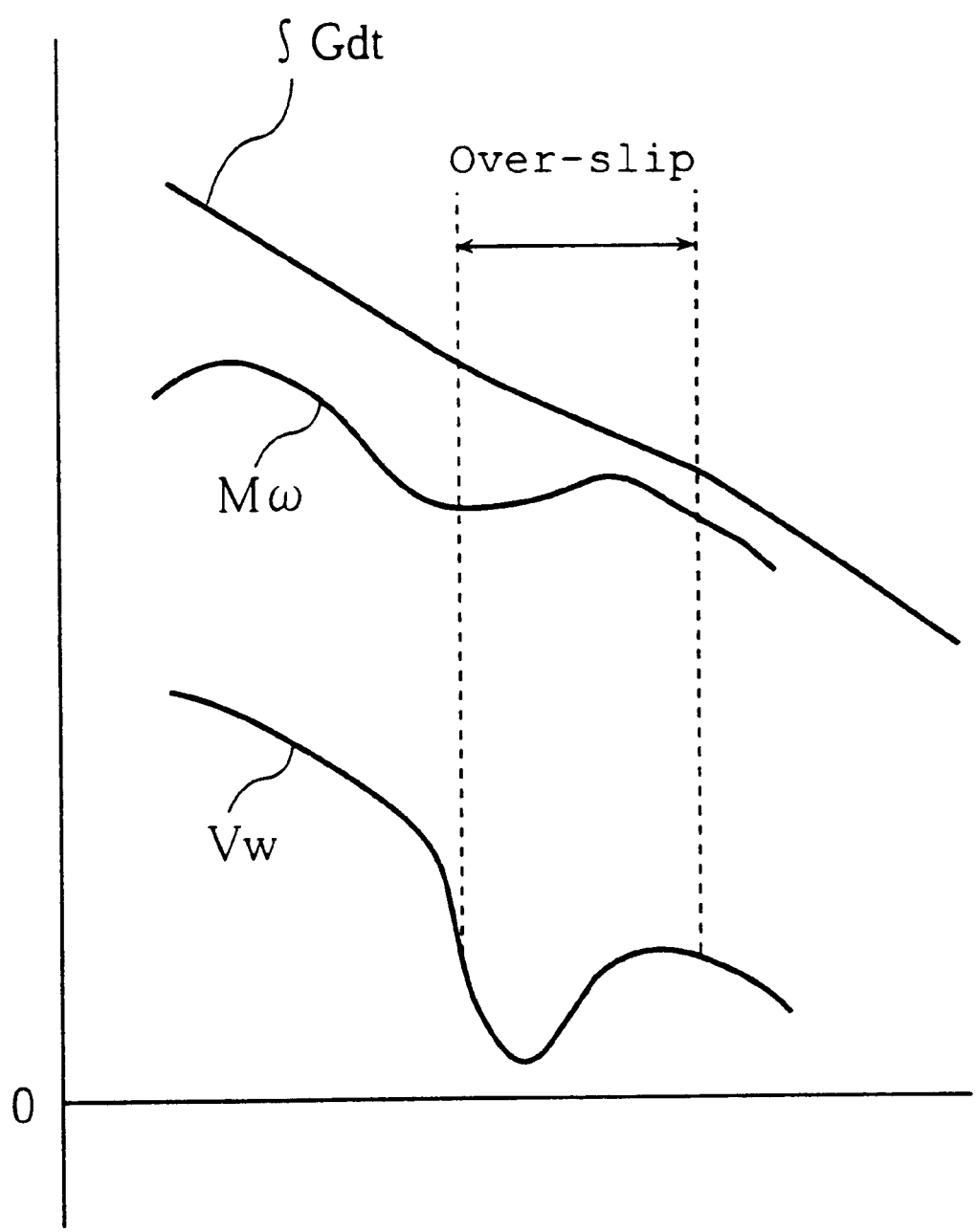
FIG. 17 is a graph showing signal wave forms at different points in the ABS apparatus according to the embodiment shown in FIG. 14.

On the other hand, if the pressure reducing operation is started at a delayed timing, or stopped before the wheel velocity is sufficiently recovered, an over slipping situation will result as already described. Once the over slipping situation develops, as shown in FIG. 17, the wheel velocity parameter Mω shows a tendency to become closer to the relative speed reduction rate of the car, i.e. the integral of the gravitational acceleration G. This behavior is linearly similar to a case when the wheel velocity is being recovered. Further, during this period, the relative car speed reduction rate, i.e. the gravitational acceleration G converges to a constant value close to 0, which is a speed reduction rate governed by the dynamic friction coefficient $\mu$ acting on the wheel. These behavioral characteristics of the wheel velocity parameter Mω and the relative speed reduction rate of the car, i.e. the gravitational acceleration G can be utilized for detecting an over slipping situation. Specifically, if both of the characteristics are observed simultaneously, an over slipping situation can be judged as having developed. Thus, it can be judged that an over slipping situation is present if the locus given by the integral of the gravitational acceleration G has a gradient not greater than a predetermined vale when the wheel velocity parameter Mω has turned from the decreasing tendency to the increasing tendency. If the over slipping situation is thus detected, the current control, i.e. increasing the brake fluid pressure P is stopped and replaced by the pressure reducing operation.

Earlier, the timing detection for stopping the pressure reducing operation based on the differential parameter M and +a was described. That detection technique belongs to a predictor control technique in which each of the parameters and settings are predetermined. The control technique using the wheel velocity parameter Mω described here above belongs to a learning control technique. Use of these different techniques in judging on the stop timing of the pressure reducing operation means that one control is provided with a plurality of confirming systems, which makes possible a more reliable and safer control.

Figure 18:
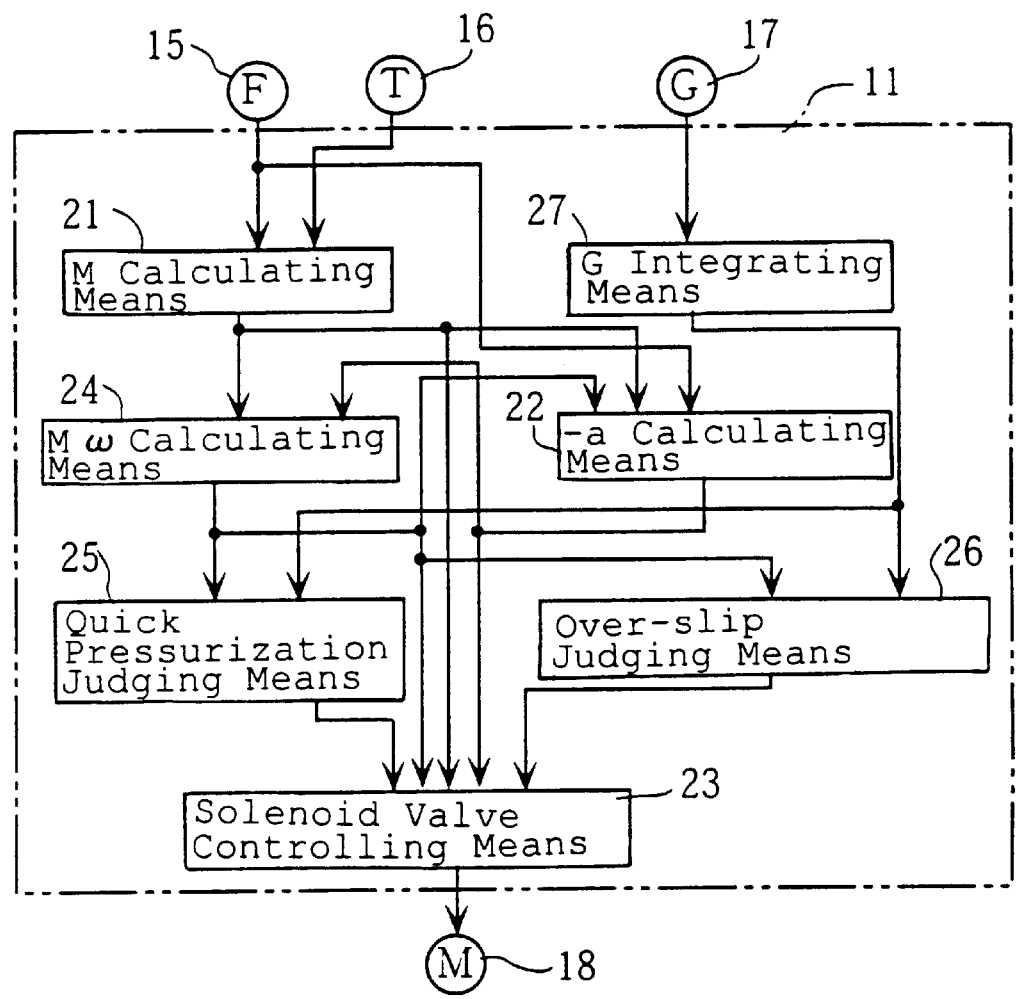
FIG. 18 is a block diagram showing a virtual circuitry relationship created by a CPU of an ABS apparatus according to still another embodiment of the present invention.

FIG. 18 is a block diagram showing a virtual circuitry relationships created by the CPU 11 in still another embodiment of the present invention. According to this embodiment, the Mω calculating means 24 varies the wheel velocity parameter Mω by integrating a difference between the value of the differential parameter M from the M calculating means 21 and a value proportional to –a from the –a calculating means 21. Further, the –a calculating means 22 varies a –a based on a difference found in the wheel velocity parameter Mω at each predetermined interval, instead of varying –a according to the changing gradient in the locus of the gravitational acceleration G. Further, the solenoid valve controlling means 23 sets a straight reference line which passes a point represented by the wheel velocity parameter Mω at the time when the braking pressure reducing operation is stared and another point represented by the wheel velocity parameter Mω, which is a control reference point retrospective by a predetermined time amount from the time when the pressure reducing operation is started. After the braking pressure reducing operation is started and when the wheel velocity parameter Mω has crossed the reference line, the solenoid valve controlling means 23 stops the braking pressure reducing operation. Further, the solenoid valve controlling means 23 compares a gradient of a current reference line with that of the previous reference line. If the gradient is found increasing, the predetermined time amount is increased to shift the reference point more retrospective, thereby correcting the current reference line. On the other hand, if the gradient is found decreasing, the predetermined time amount is shortened to shift the reference point closer, thereby correcting the current reference line. Otherwise, the present embodiment is the same as the previous embodiment represented by the block diagram shown in FIG. 14.

Now, theoretic discussion will be made for reasons why the above arrangement can provide superior ABS control. It should be noted however, that part of the discussion overlapping the previous discussions made with reference to FIG. 10 will not be repeated.

Figure 19:
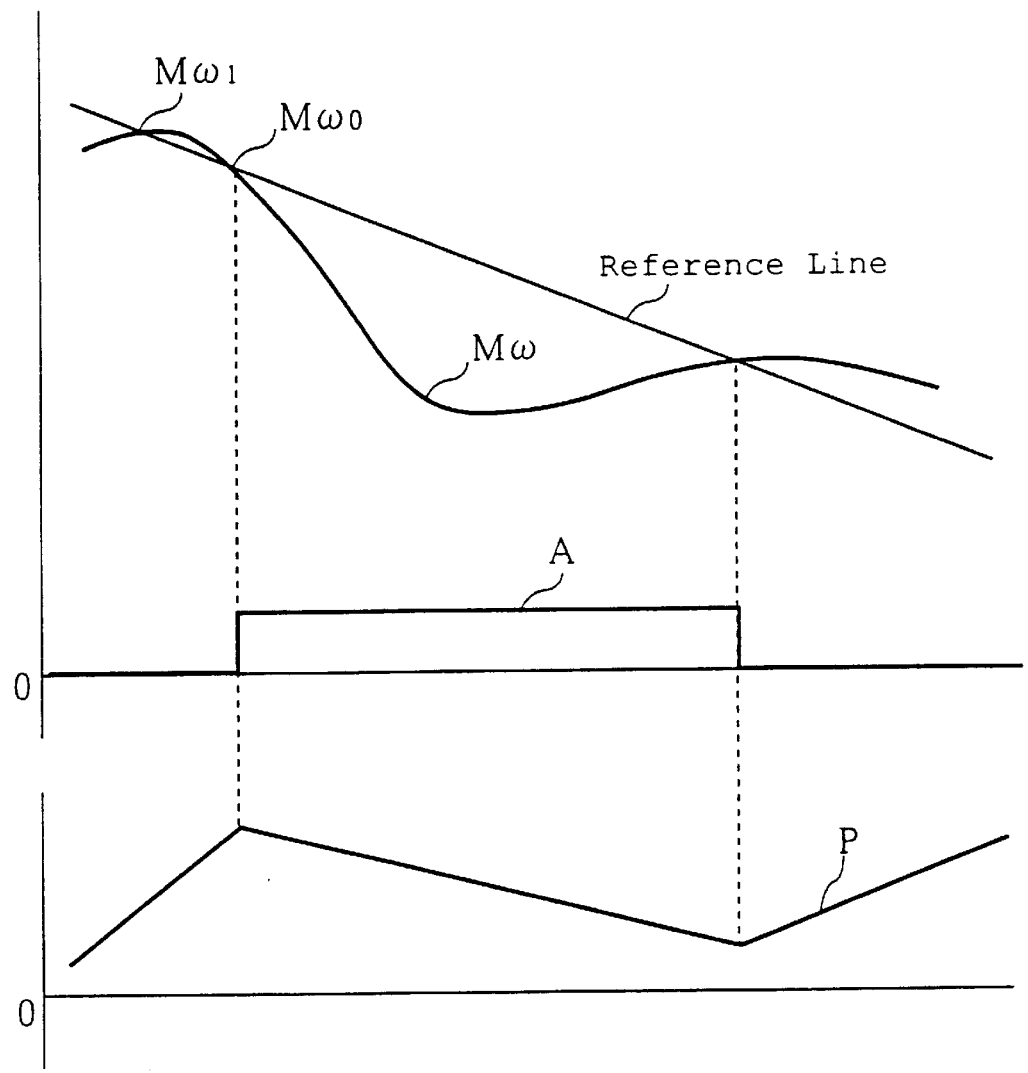
FIG. 19 is a graph showing signal wave forms at different points in the ABS apparatus according to the embodiment shown in FIG. 18.

FIG. 19 is a chart illustrating how a timing for stopping the braking pressure reducing operation is decided by utilizing the behavioral pattern of the wheel velocity parameter Mω. In this method, a value of the parameter in the previous control cycle is stored in memory, and is used as a basis for setting controlling conditions for the current control cycle. Use of such a learning control technique provides a very powerful control means in the judgment on the timing to stop reducing the brake fluid pressure P. Specifically, a reference line is provided which varies exactly the same as does the approximation to the wheel velocity $V_w$, i.e. the wheel velocity parameter Mω, when the pressure reducing operating is not performed but begins varying at a predetermined gradient as shown in FIG. 19 once the pressure reducing operation control is started, with an initial value equal to the value $M\omega_0$ of the wheel velocity parameter Mω at the time the pressure reducing operation control is started. The reference line is the straight line passing the two points, i.e. the initial value $M\omega_0$ and another value $M\omega_1$ which is the value at the retrospective time point by a predetermined time amount before the pressure reducing operation is started. The reference line represents a rate of change in the wheel velocity parameter Mω in an approximated stable region. Therefore, when the wheel velocity parameter Mω comes back to the reference line, it can be judged that the wheel velocity has reliably entered the stable region and thus the pressure reducing operation can be stopped at this time.

Generally, road conditions during braking operation is always changing. For this reason, the decision on the stop timing for the braking pressure reducing operation based on the wheel velocity parameter Mω which simulates the wheel velocity $V_w$ should also be performed with concurrent response to the changing road conditions. Specifically, a plurality of points each varies in proportion to the wheel velocity $V_w$ at the time when the braking pressure reducing operation is started are set for reference to the wheel velocity parameter Mω. Then, a gradient of the reference line calculated in a current cycle of control is compared with a gradient of the reference line used in the previous cycle of control. This clarifies an extent of wheel locking, making possible to select an appropriate control reference point based on a rate of change in the gradient. For example, if the rate of change in the reference line is large, it can be judged that the road condition has changed to a more slippery situation and the wheel locking is progressing rapidly. In such a case a control reference point is selected so that there is a longer time period between the reference point and the time at which the pressure reducing operation is started. This will result in a reference line having a gentler gradient, allowing a longer period for the pressure reducing control. On the other hand, if the rate of change in the reference line is small, the wheel locking is progressing more slowly than in the previous time, i.e. the pressure reducing operation may be performed for a shorter period of time. Thus, a control reference point is selected so that there is a shorter time period between the reference point and the time at which the pressure reducing operation is started, for generating a reference line having a steeper gradient. As has been understood from the above, a range from which the control reference point is selected makes possible to prevent an insufficient pressure reduction when the wheel locking is progressing rapidly or an excessive pressure reduction after the wheel locking situation has been cleared, making possible to provide control more truly responding to the changing conditions of the wheel which is a direct receiver of information on the changing road condition.

Change in the road condition during the braking operation can be estimated from a value given by a two point differential expression of the wheel velocity parameter Mω which can be approximated to the wheel velocity $V_w$. The two point differential is a value given by a real time calculation of an amount of change in the wheel velocity parameter Mω in a given time period, which represents an amount of change in the wheel velocity $V_w$.

An example is taken for a case when braking operation is being performed to the car running on changing road conditions such as from wet asphalt to dry asphalt. During a former part while the car is running on wet asphalt, the friction coefficient $\mu$ on the road assumes a small value, and therefore −a must be set to a relatively small value. Then, needless to say, the differential parameter M assumes an accordingly small value, and the amount of change in the wheel velocity parameter Mω which corresponds to an integrated value of M is also small. However, when the car comes in the dry asphalt road, the friction coefficient $\mu$ then takes a large value, making possible to lower −a, and the amount of change in the wheel velocity parameter Mω increases accordingly. This singular point in the wheel velocity parameter Mω corresponds to a point of transition in the road condition at which the road friction coefficient $\mu$ changes drastically, making possible to set a new value for −a to match the new road condition.

As described above, according to each of the embodiments using the circuitry concepts shown in FIGS. 14 and 18, the timing for stopping the pressure reducing operation is judged by using the differential parameter M obtained from information on the road frictional force F and the braking torque T, and further by using the wheel velocity parameter Mω obtained from the differential parameter M. Thus, differing from the prior art control using the gear which turns with the wheel, it becomes possible to always perform accurate control regardless of conditions such as the car speed. Further, the differential parameter M and the wheel velocity parameter Mω do not contain any crosstalk component of the braking torque T included in the road frictional force F. This further increases accuracy in the control.

Further, the differential parameter M calculated by the differential parameter calculating means 21 is corrected and then integrated to give the wheel velocity parameter Mω, which becomes 0 when the wheel is locked. Therefore, it becomes possible to obtain the wheel velocity parameter Mω which simulates the behavior of the actual wheel velocity very closely, making possible to respond more quickly and accurately to changes in road conditions, increasing further the accuracy of the control.

Further, the control uses not only the differential parameter M but also the wheel velocity parameter Mω. This makes possible to eliminate a problem of inaccurate control in an over slipping situation, which is a problem in the control based only on the differential parameter M. This advantage is significant especially in a road having a low $\mu$.

Figure 20:
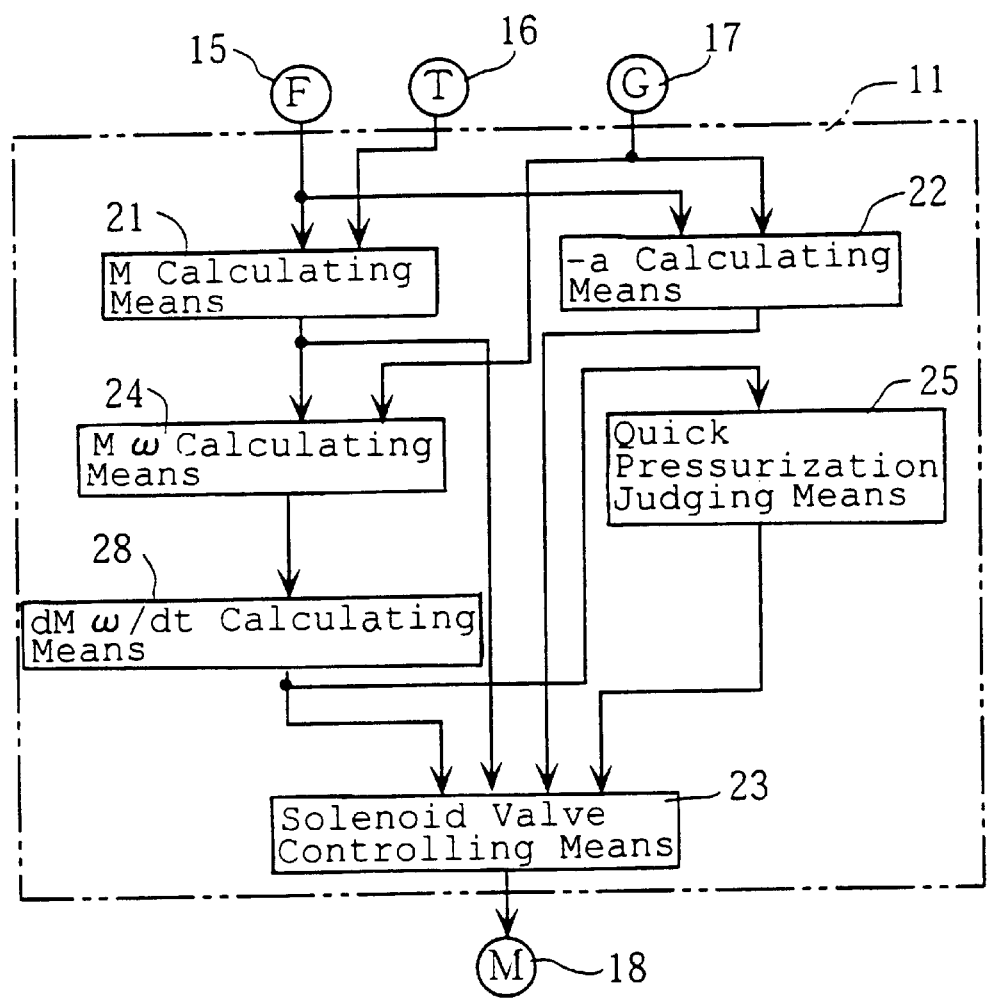
FIG. 20 is a block diagram showing a virtual circuitry relationship created by a CPU of an ABS apparatus according to still another embodiment of the present invention.

FIG. 20 is a block diagram showing a virtual circuitry relationships created by the CPU 11 according to still another embodiment of the present invention. Specifically, the CPU 11 provides M calculating means 21, Mω calculating means 24, dM/dt calculating means 28, −a calculating means 22, quick pressurization judging means 25, and solenoid valve controlling means 23. Each of these circuitry is realized by the CPU 11 in its execution of an ABS control program stored in the ROM 13 when a brake pedal of the car is depressed. Though not illustrated in the figure, the depressing of the brake pedal is judged by the CPU 11 according to detection signals from a sensor mounted to the brake pedal or from a sensor monitoring brake fluid pressure of the braking equipment.

The M calculating means 21 receives via the interface 14 information on road frictional force F from the road frictional force sensor 15, and information on braking torque value T from the braking torque sensor 16 for calculating a differential parameter M=F−T.

The Mω calculating means 24 calculates a wheel velocity parameter Mω by integrating M−G, based on the differential parameter M from the M calculating means 21 and the gravitational acceleration G from the gravitational acceleration sensor 1 entered via the interface 14.

The dM/dt calculating means 28 calculates a wheel acceleration parameter dM/dt by differentiating the wheel velocity parameter Mω from the Mω calculating means.

The −a calculating means 22 receives via the interface 14 information on the road frictional force F from the road frictional force sensor 15, and information on the gravitational acceleration G from the gravitational acceleration sensor 17 for calculating a value for −a as a first threshold. Specifically, the gravitational acceleration G is monitored at a predetermined time interval. A difference between a current value of the gravitational acceleration G and the previous value of gravitational acceleration G is used for calculating a gradient of a locus given by the gravitational acceleration G, and according to this gradient, −a is varied continuously or in a stepped manner. Further, the −a calculating means 22 also varies −a continuously or in a stepped manner according to a difference between a current value of road frictional force F at the time of current pressure reduction start and a value of road frictional force F at the time of the previous pressure reduction start. It should be noted that an initial value of −a when the brake pedal begins being depressed is predetermined according to a standard peak value in the negative direction of the differential parameter M, and is stored in the ROM 13.

The quick pressurization judging means 25 compares a value of the wheel acceleration parameter dMω/dt from the dMω/dt calculating means 28 and a value of +A stored in the ROM 13 as a fifth threshold value. If the value of the wheel acceleration parameter dMω/dt reaches the fifth threshold +A, then the quick pressurization judging means 25 judges that an excessive pressure reduction is present, and outputs a quick pressurization command signal. When the value of the wheel acceleration parameter dMω/dt becomes smaller than the fifth threshold +A, then the quick pressurization judging means 25 stops outputting the quick pressurization command signal.

The solenoid valve controlling means 23 switches power supply to a solenoid of the solenoid valve 18 according to information on the differential parameter M from the M calculating means 21, wheel acceleration parameter dMω/dt from the dMω/dt calculating means 28, −a from the −a calculating means 22, and the quick pressurization command from the quick pressurization judging mans 25.

Next, a cycle of actions which takes place in the above ABS apparatus is described. When the brake pedal is depressed, the solenoid controlling means 23 monitors the differential parameter M coming from the M calculating means 21 and −a coming from the −a calculating means 22. When the value of differential parameter M has decreased to −a, the solenoid controlling means 23 operates the solenoid valve 18 to decrease the brake fluid pressure. The solenoid controlling means 23 then monitors the wheel acceleration parameter $dM\omega/dt$ coming from the $dM\omega/dt$ calculating means 28. After the braking pressure reducing operation has been started, when the wheel acceleration parameter $dM\omega/dt$ reaches the second threshold, then the solenoid valve controlling means 23 controls the solenoid valve 18 to stop the pressure reducing operation. The solenoid controlling means 23 then repeats a cycle of increasing the pressure for 10 mm second and maintaining the pressure for 40 mm second for example, gradually increasing the brake fluid pressure.

The above cycle of the decreasing control and increasing control of the brake fluids pressure is repeated until the car comes to a complete stop.

During the above control cycle, the −a calculating means 22 updates −a according to the gradient of the gravitational acceleration G coming from the gravitational acceleration sensor 17. Specifically, the gradient in the gravitational acceleration G is large on a road having a large road friction coefficient $\mu$, whereas the gradient in the gravitational acceleration G is small on a road having a small road friction coefficient $\mu$. Thus, by varying the value of the first threshold, i.e. −a, based on the road condition, timing to start and stop the braking pressure reducing operation is varied.

Further, the −a calculating means 22 also varies −a according to a difference found in the road frictional force F at each cycle of the pressure reducing control. Specifically, the difference between a current value of the frictional force F and the previous value of the frictional force F is multiplied by a predetermined coefficient. The obtained result of the above calculation is then multiplied by the value of previous −a, and the result is subtracted from the value of previous −a to give a value for the current −a. In other words, −a is varied according to variation in the moment of inertia resulting from change in car speed.

On the other hand, if the pressure reducing operation is stopped at a delayed timing, the wheel acceleration parameter $dM\omega/dt$ takes an excessively large value. This behavioral pattern in utilized by the quick pressurization judging means 25 for detecting the delay in stopping the pressure reducing operation and outputting the quick pressurization command to the solenoid valve controlling means 23. The solenoid valve controlling means 23 then quickly increases the braking pressure until the wheel acceleration parameter $dM\omega/dt$ takes a value not greater than that of the fifth threshold, when the quick pressurization judging means 25 stops outputting the quick pressurization command signal. The solenoid controlling means 23 then starts a cycle of gradually increasing the braking pressure by controlling the solenoid valve 18.

Now, theoretic discussion will be made for reasons why the above arrangement can provide superior ABS control. It should be noted however, that part of the discussion overlapping the previous discussions made with reference to FIGS. 5, 6, 9 and 12 will not be repeated.

Figure 21:
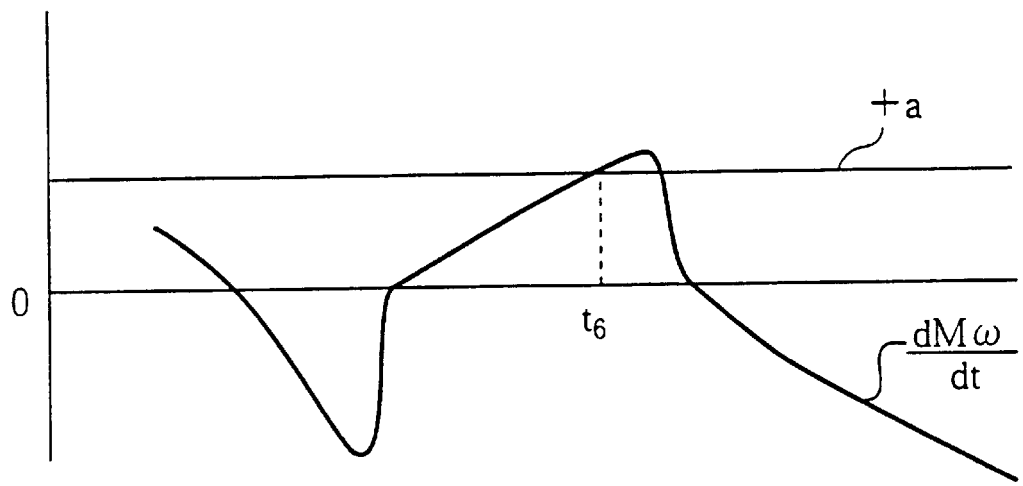
FIG. 21 is a graph showing signal wave forms at different points in the ABS apparatus according to the embodiment shown in FIG. 20.

The wheel acceleration parameter $dM\omega/dt$ is a differential of the wheel velocity parameter $M\omega$. In order to use this wheel acceleration parameter $dM\omega/dt$ for judging on the stop timing of the pressure reducing operation, the second threshold +a is used as shown in FIG. 21. Specifically, a time point $t_6$ where the wheel acceleration parameter $dM\omega/dt$ has reached the second threshold +a after the braking control is started is judged as the time for stopping the pressure reducing operation, i.e. the time when the wheel velocity has reliably entered the stable region.

With the above method, even if an amount of change in the differential parameter M is extremely small, e.g. while running on a road having an extremely low $\mu$, the amount of change in the wheel acceleration parameter $dM\omega/dt$ is sufficiently large, making possible to accurately judge on the stop timing of the pressure reducing operation. Further, since the wheel acceleration parameter $dM\omega/dt$ does not have an initial value as does the wheel velocity parameter $M\omega$, it becomes possible to perform the control in a region close to 0 level.

Figure 22:
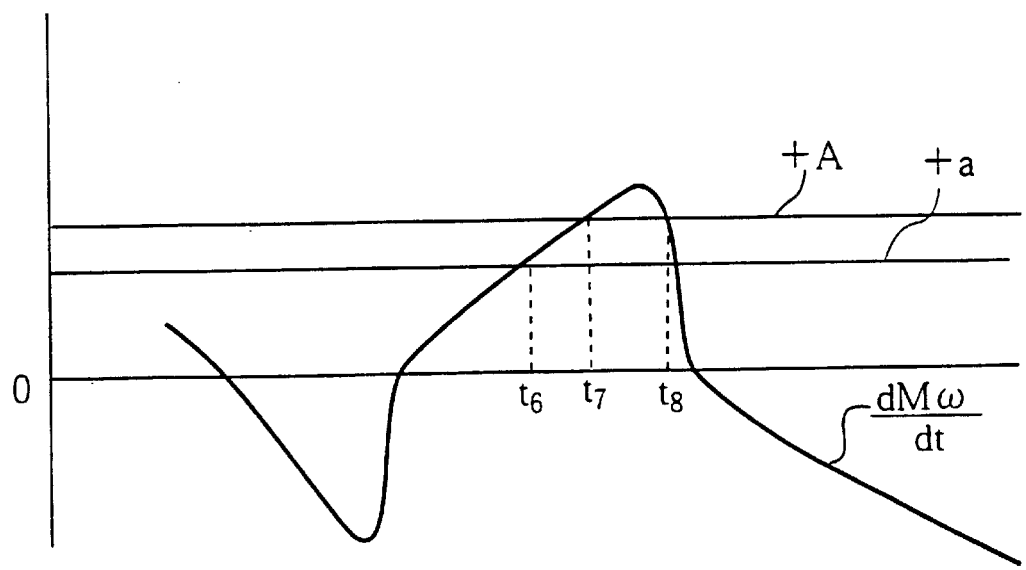
FIG. 22 is a graph showing signal wave forms at different points in the ABS apparatus according to the embodiment shown in FIG. 20.

During the pressure reducing operation, if the pressure is reduced excessively when the wheel velocity has already restored, the wheel velocity shows a tendency to become closer to the relative car speed, resulting in a loss in a rate of slip. During this period, as shown in FIG. 22, the wheel acceleration parameter $dM\omega/dt$ exceeds the second threshold, approaching the fifth threshold +A. When such an excessive reduction is made in the braking pressure, the loss in slip rate will not be recovered by a normal gradual pressure increase performed under the pulse step control which generally follows the pressure reducing operation. In order to make up for a resulting loss in braking distance, the fifth threshold +A which has a value greater than that of the second threshold is provided, and if the wheel acceleration parameter $dM\omega/dt$ exceeds this fifth threshold +A at $t_7$, then the normal gradual pressure increasing control is replaced by a quick pressure increasing control. This will recover the loss in the slip rate, and when the wheel acceleration parameter $M\omega/dt$ comes back to the fifth threshold, i.e. +A, the loss in slip rate is judged to have been recovered, and the normal gradual pressure increasing control takes over.

Figure 23:
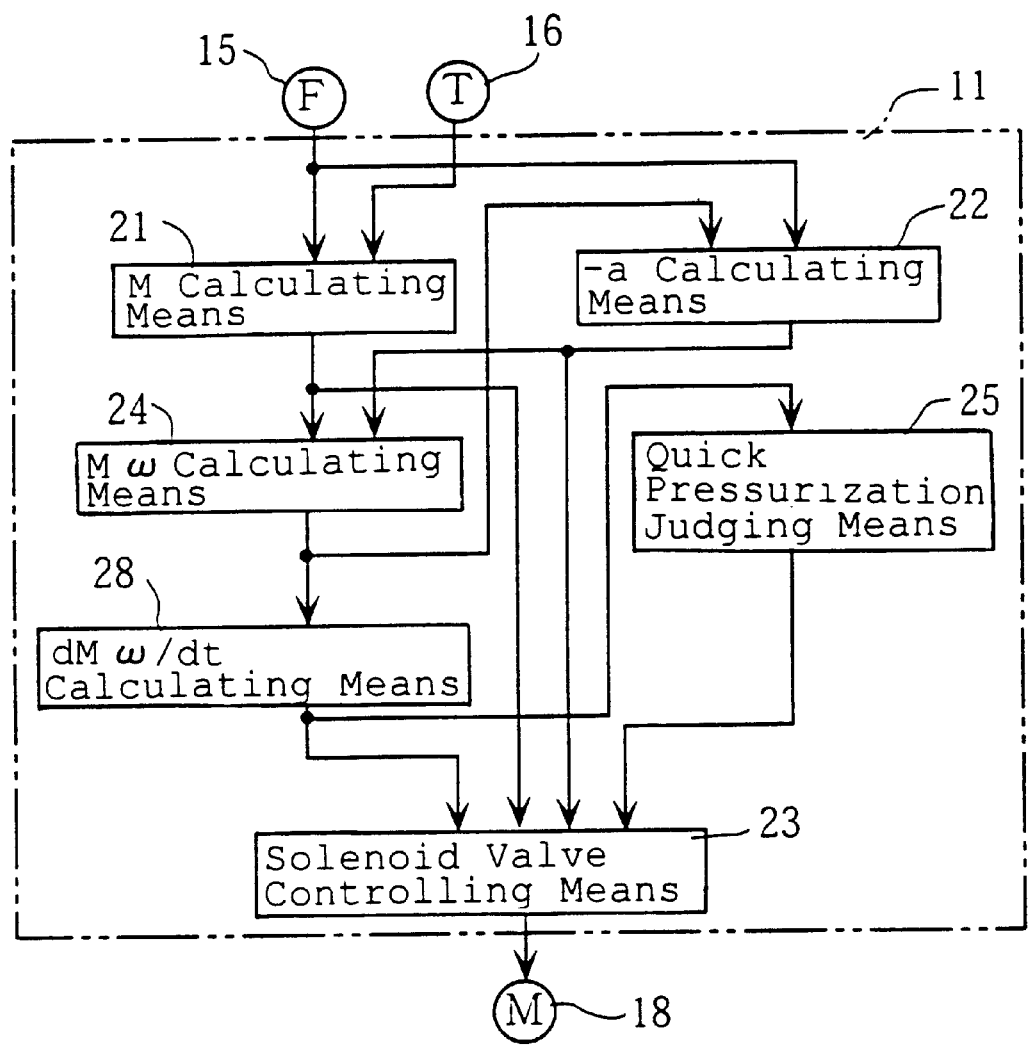
FIG. 23 is a block diagram showing a virtual circuitry relationship created by a CPU of an ABS apparatus according to still another embodiment of the present invention.

FIG. 23 is a block diagram showing a virtual circuitry relationships created by the CPU 11 in still another embodiment of the present invention. According to this embodiment, the $M\omega$ calculating means 24 calculates a wheel velocity parameter $M\omega$ by integrating a difference between the differential parameter M from the M calculating means 21 and a value proportional to −a from the −a calculating means 22, instead of integrating the difference M-G which is the difference between the differential parameter M and the gravitational acceleration G. Otherwise, the present embodiment is the same as the previous embodiment represented by the block diagram shown in FIG. 20. The present embodiment is advantageous in that the gravitational acceleration sensor 17 can be eliminated.

The above method can provide superior ABS control with the same reasons as already described earlier with reference to FIG. 10, and thus, the description will not be repeated here.

As has been described above, according to each of the embodiments using the circuitry concepts shown in FIGS. 20 and 23, the control is performed by using the differential parameter M obtained from information on the road frictional force F ad the braking torque T, and further by using the wheel acceleration parameter $dM\omega/dt$ obtained from the differential parameter M. Thus, differing from the prior art control using the gear which turns with the wheel, it becomes possible to always perform accurate control regardless of conditions such as the car speed. Further, the differential parameter M and the wheel acceleration parameter $dM\omega/dt$ do not contain any crosstalk component of the braking torque T included in the road frictional force F. This further increases accuracy in the control.

Further, the differential parameter M calculated by the differential parameter calculating means is corrected and then integrated to give the wheel acceleration parameter dMω/dt, which becomes 0 when the wheel is locked. Therefore, it becomes possible to obtain the wheel acceleration parameter dMω/dt which simulates the behavior of the actual wheel acceleration very closely, making possible to respond more quickly and accurately to changes in road conditions, increasing further the accuracy of the control.

Further, the control uses the wheel acceleration parameter dMω/dt. This advantageously eliminates a problem in the control based only on the differential parameter M. Specifically, if the control is based only on the differential parameter M, on a road having an extremely low μ where the amount of change in M is extremely small, the first threshold for judging on the stop timing of the pressure reducing operation becomes extremely shallow, causing delay in response from a hydraulic system, and making the control impossible. Further, the present embodiment has an advantage over the method of using the wheel velocity parameter Mω for judging the stop timing of pressure reducing operation. Specifically, the wheel acceleration parameter dMω/dt does not have an initial value as does the wheel velocity parameter Mω. This allows monitoring the parameter behavior in a region close to 0 level, making possible an easy, quick and highly accurate control.

According to each of the embodiments so far described, an arrangement is made so that the M calculating means 21 calculates the differential parameter M based on road friction information and braking torque information by subtracting a value of the braking torque T from a value of the road frictional force F, i.e. F−T. However, the arrangement is not necessarily be like the above. For example, where R is a radius of the wheel, and r is a distance from a center of turning in the wheel to a braking calipers of the braking equipment, the differential parameter M may be obtained by having a ratio of the radius R to the distance r multiplied by a value of the road frictional force F, and then subtracting a value of the braking torque T from the product based on the road friction information and the braking torque information; i.e. the differential parameter M may be defined as (R/r)F−T. Since the radius R and distance r are each predetermined according to a car to be mounted with the ABS apparatus, a value of the constant R/r is also available, and the value of the constant R/r should be stored in the ROM 13 for example.

Specifically, where R is a radius of the wheel, and r is a distance from a center of turning in the wheel to a braking calipers of the braking equipment, a tire torque is expressed as RF, and the braking torque as rT. Since the above equation (1) can be transformed to an expression (4), it is clear that (R/r)F−T can be used as the differential parameter M $$I\frac{d\omega}{dt} = RF - rT \qquad (4)$$
$$= \frac{R}{r}F - T$$

With the above method, the differential parameter M assumes a value 0 when the car comes to a complete stop, making the control easier. Further, a peak value while the braking equipment is in action appears earlier, reaching the first threshold, i.e. −a also earlier, making an over slipping situation less likely to develop.

Figure 24:
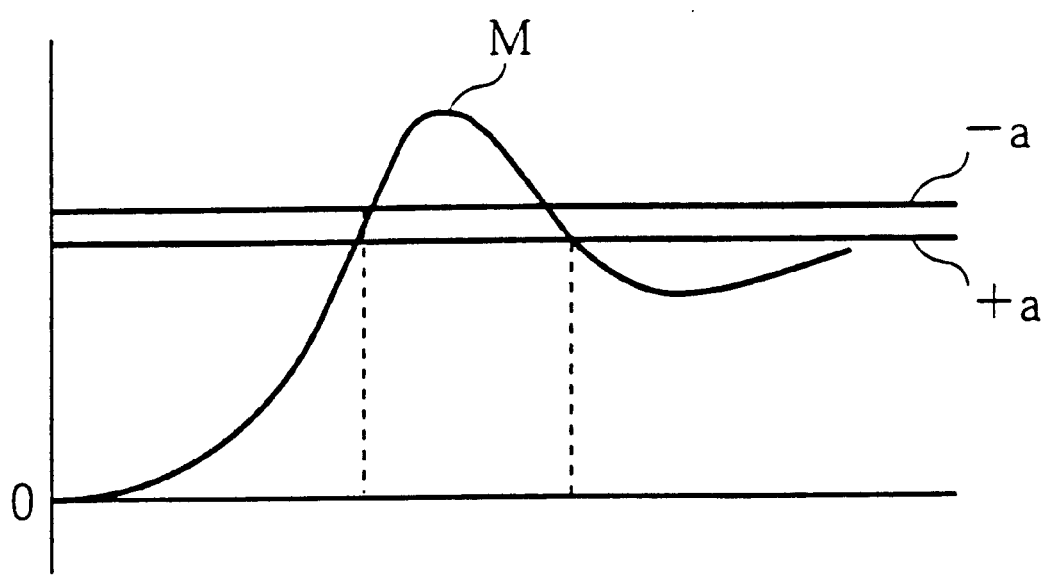
FIG. 24 is a graph showing a wave form of a differential parameter shifted to the positive region.

It should be noted that with the above method, the differential parameter M may behave in the positive region as shown in FIG. 24. In such a case, the second threshold +a may be given a value smaller than the value of the first threshold, which means that an absolute value of the second threshold +a is smaller than an absolute value of the first threshold whether or not the value of differential parameter M is positive or negative. The second threshold +a may of course be given a value equal to the value of the first threshold −a. In such a case there is no need to consider if the differential parameter M is in the positive or negative region.

Further, when the car is making a turn, the differential parameter M may be obtained by using a cornering force $F_S$, from road friction information according to this cornering force $F_S$ and braking torque information according to the braking torque T, instead of using the road frictional force F. The cornering force $F_S$ is a force which acts on the wheel vertically to a direction of car's motion. Of course each wheel receives braking operation individually from others. Specifically, while the care is making a turn, inner and outer wheels are respectively under different forces, with the inner wheel more likely to be locked. However, by using the cornering force $F_S$ for the braking control, it is expected that such a problem is eliminated, resulting in more appropriate control.

Now, it is a public knowledge that the cornering force $F_S$ can be derived from Fiala's theory on cornering characteristics of tires, and such a cornering force $F_S$ can be approximately expressed as a product of a cornering power K and an angle of side slip β, i.e. Kβ. Here, the cornering power K is a constant given by a tread pattern and material of the tires whereas β is a deviation between an axis which is vertical to an axis of tire rotation and the direction in which the car is moving. Further, the angle of side slip β can generally be obtained based on a steering angle of the wheel. Thus, by providing a steering angle sensor for detecting the steering angle of each wheel, the angle of side slip β may be obtained based on detection signals from the steering angle sensor, and this angle of side slip β and the cornering power may be used for calculating the cornering force $F_S$. This cornering force $F_S$ may then be used as the road friction information for calculating the differential parameter M, on which the braking control is based.

Further, according to each of the embodiments described above, each of the road friction force information, braking torque information, and gravitational acceleration information was supplied directly from an individual sensor. However, the information may be obtained through calculation. For example, the road friction force information may be obtained directly from an individual sensor, but may also be obtained by multiplication, in which a detection signal from a sensor which outputs road friction coefficient information according to the road friction coefficient μ may be multiplied by a constant based on a weight of the car. Still further, the information may be obtained through calculation using detection signals from a plurality of sensors.

The M calculating means calculates M=$\alpha_3(\alpha_1 F - \alpha_2 T)$, where each of $\alpha_1$, $\alpha_2$ and $\alpha_3$ is a predetermined coefficient other than 0, and if $\alpha_1=\alpha_2=\alpha_3=1$ as in the above embodiments, then M=F−T.

What is claimed is:

1. An ABS apparatus comprising:
   a frictional force sensor for obtaining road frictional force information according to road frictional force F acting between a wheel of a car and a road on which the car is moving;
   a brake torque sensor for obtaining braking torque information according to braking torque T acting between the wheel of the car and a braking device;

a differential parameter calculating means for calculating a differential parameter M according to the road frictional force information and the braking torque information; and a brake fluid pressure controlling means for starting a pressure reducing operation when the differential parameter M drops to a first threshold and for subsequently stopping the pressure reducing operation when the differential parameter M rises to a second threshold having an absolute value equal to or slightly smaller than the first threshold.

2. The ABS apparatus according to claim 1, wherein the differential parameter calculating means obtains a value F−T as the differential parameter M by subtracting the braking torque T from the road frictional force F based on the braking torque information and road frictional force information.

3. The ABS apparatus according to claim 1, wherein the differential parameter calculating means obtains a value (R/r)F−T as the differential parameter M based on the braking torque information and the road frictional force information;

where R is a radius of the wheel, and r being a distance from a center of turning in the wheel to a braking calipers of the braking equipment, the differential parameter M being obtained by having a ratio of the radius R to the distance r multiplied by a value of the road frictional force F, and then subtracting a value of the braking torque T from the product.

4. The ABS apparatus according to claim 1, wherein, while the car is making a turn, a cornering force $F_S$ acting on the wheel vertically to a direction of car's motion is used instead of the road frictional force F, the differential parameter M being obtained from the cornering force $F_S$ and the braking torque information.

5. The ABS apparatus according to claim 4, wherein the ABS apparatus further comprises a steering angle sensor for detecting the steering angle of the wheel for calculating an angle of side slip β as a deviation between an axis vertical to an axis of tire rotation and the direction in which the car is moving, for further calculating the cornering force $F_S$ from the angle of side slip β.

6. An ABS apparatus comprising:

a frictional force sensor for obtaining road frictional force information according to road frictional force F acting between a wheel of a car and a road on which the car is moving;

a brake torque sensor for obtaining braking torque information according to braking torque T acting between the wheel of the car and a braking device;

a differential parameter calculating means for calculating a differential parameter M according to the road frictional force information and the braking torque information;

a brake fluid pressure controlling means for controlling brake fluid pressure of the braking device by using the differential parameter M and a first threshold according to a peak value of the differential parameter M;

a gravitational acceleration sensor for obtaining gravitational acceleration information according to gravitational acceleration G acting on the car; and a gravitational acceleration change rate calculating means for calculating a gradient of locus given by the gravitational acceleration information;

wherein road conditions are judged based on the gradient of a locus of gravitational acceleration information calculated by the gravitational acceleration change rate calculating means.

7. The ABS apparatus according to claim 6, wherein the brake fluid pressure controlling means starts a pressure reducing operation when the differential parameter M drops to the first threshold and for subsequently stopping the pressure reducing operation when the differential parameter M rises to a second threshold having an absolute value equal to or slightly smaller than the first threshold.

8. The ABS apparatus according to claim 6, wherein the ABS apparatus further comprises a first threshold varying means for varying the first threshold according to the gradient of the locus of gravitational acceleration information calculated by the acceleration change rate calculating means.

9. An ABS apparatus comprising:

a frictional force sensor for obtaining road frictional force information according to road frictional force F acting between a wheel of a car and a road on which the car is moving;

a brake torque sensor for obtaining braking torque information according to braking torque T acting between the wheel of the car and a braking device;

a differential parameter calculating means for calculating a differential parameter M according to the road frictional force information and the braking torque information;

a brake fluid pressure controlling means for controlling brake fluid pressure of the braking device by using the differential parameter M and a first threshold according to a peak value of the differential parameter M;

a road frictional force change rate calculating means for calculating a difference between a present value of the road frictional force information in a presently performed pressure reducing operation and a previous value of the road frictional force information in a previously performed pressure reducing operation; and a first threshold varying means for varying the first threshold according to an amount of change in the road frictional force information calculated by the road frictional force change rate calculating means.

10. The ABS apparatus according to claim 9, wherein the brake fluid pressure controlling means starts a pressure reducing operation when the differential parameter M drops to the first threshold and for subsequently stopping the pressure reducing operation when the differential parameter M rises to a second threshold having an absolute value equal to or slightly smaller than the first threshold.

11. An ABS apparatus comprising:

a frictional force sensor for obtaining road frictional force information according to road frictional force F acting between a wheel of a car and a road on which the car is moving;

a brake torque sensor for obtaining braking torque information according to braking torque T acting between the wheel of the car and a braking device;

a differential parameter calculating means for calculating a differential parameter M according to the road frictional force information and the braking torque information;

a brake fluid pressure controlling means for controlling brake fluid pressure of the braking device by using the differential parameter M and a first threshold according to a peak value of the differential parameter M;

a gravitational acceleration sensor for obtaining gravitational acceleration information according to gravitational acceleration G acting on the car;

a wheel velocity parameter calculating means for calculating a wheel velocity parameter $M\omega$ by integrating a difference between the differential parameter M and the gravitational acceleration information;

a two-point difference calculating means for calculating at a predetermined time interval a difference in the wheel velocity parameter $M\omega$ calculated by the wheel velocity parameter calculating means; and a first threshold varying means for varying the first threshold according to the two-point difference in the wheel velocity parameter $M\omega$ calculated by the two-point difference calculating means.

12. The ABS apparatus according to claim 11, wherein the brake fluid pressure controlling means starts a pressure reducing operation when the differential parameter M drops to the first threshold and for subsequently stopping the pressure reducing operation when the differential parameter M rises to a second threshold having an absolute value equal to or slightly smaller than the first threshold.

13. An ABS apparatus comprising:

a frictional force sensor for obtaining road frictional force information according to road frictional force F acting between a wheel of a car and a road on which the car is moving;

a brake torque sensor for obtaining braking torque information according to braking torque T acting between the wheel of the car and a braking device;

a differential parameter calculating means for calculating a differential parameter M according to the road frictional force information and the braking torque information;

a brake fluid pressure controlling means for controlling a brake fluid pressure of the braking device by using the differential parameter M and a first threshold according to a peak value of the differential parameter M;

a wheel velocity parameter calculating means for calculating a wheel velocity parameter $M\omega$ by integrating a difference between the differential parameter M and a value proportion to the first threshold;

a two-point difference calculating means for calculating at a predetermined time interval a difference in the wheel velocity parameter $M\omega$ calculated by the wheel velocity parameter calculating means; and a first threshold varying means for varying the first threshold according to the difference in the wheel velocity parameter $M\omega$ calculated by the two-point difference calculating means.

14. The ABS apparatus according to claim 13, wherein the brake fluid pressure controlling means starts a pressure reducing operation when the differential parameter M drops to the first threshold and for subsequently stopping the pressure reducing operation when the differential parameter M rises to a second threshold having an absolute value equal to or slightly smaller than the first threshold.

15. An ABS apparatus comprising:

a frictional force sensor for obtaining road frictional force information according to road frictional force F acting between a wheel of a car and a road on which the car is moving;

a brake torque sensor for obtaining braking torque information according to braking torque T acting between the wheel of the car and a braking device;

a differential parameter calculating means for calculating a differential parameter M according to the road frictional force information and the braking torque information;

a brake fluid pressure controlling means for controlling a brake fluid pressure of the braking device by using the differential parameter M and a first threshold according to a peak value of the differential parameter M;

a differential parameter change rate calculating means for calculating a rate of change dM/dt of the differential parameter M; and an over-slip controlling means for judging an over slipping situation to be present in the wheel when the rate of change dM/dt calculated by the differential parameter change rate calculating means exceeds a third threshold and reducing a fluid pressure of the braking equipment.

16. The ABS apparatus according to claim 15, wherein the over-slip controlling means judges the over slipping situation to have been sufficiently eliminated for stopping the pressure reducing operation of the braking equipment when a fluctuation of the rate of change dM/dt becomes smaller than a predetermined value after reducing the fluid pressure of the braking equipment.

17. The ABS apparatus according to claim 15, wherein the over-slip controlling means judges the over slipping situation to have been sufficiently eliminated for stopping the pressure reducing operation of the braking equipment when a fluctuation of the rate of change dM/dt becomes smaller than a predetermined value continually for a plurality of times after reducing the fluid pressure of the braking equipment.

18. The ABS according to claim 15, wherein the over-slip controlling means judges the over slipping situation to have been sufficiently eliminated for stopping the pressure reducing operation of the braking equipment if the differential parameter M is greater than a predetermined value when a fluctuation of the rate of change dM/dt becomes smaller than a predetermined value after reducing the fluid pressure of the braking equipment.

19. The ABS apparatus according to claim 15, wherein the over-slip controlling means judges the over slipping situation to have been sufficiently eliminated for stopping the pressure reducing operation of the braking equipment if the differential parameter M is greater than a predetermined value when a fluctuation of the rate of change dM/dt becomes smaller than a predetermined value continually for a plurality of times after reducing the fluid pressure of the braking equipment.

20. The ABS apparatus according to claim 15, wherein the ABS apparatus further comprises;

a first threshold varying means for varying the first threshold; and a first threshold resetting means for judging a friction coefficient to have decreased rapidly and setting the first threshold to a predetermined value if the rate of change dM/dt exceeds a fourth threshold which is sufficiently larger than the third threshold while an over slipping situation is judged to be present by the over-slip controlling means.

21. The ABS apparatus according to claim 15, further comprising a first threshold varying means for varying the first threshold according to the differential parameter M when the over slipping situation of the wheel is judged to be present by the over-slip controlling means.

22. The ABS apparatus according to claim 21, wherein three absolute values are predetermined for the first threshold according to high $\mu$, middle $\mu$, and low $\mu$ of road friction coefficients, and wherein the first threshold varying means renews the first threshold using the three absolute values for the high $\mu$, middle μ, and low μ of road friction coefficients when the over-slip controlling means detects an over slipping situation of the wheel.

23. An ABS apparatus comprising
a frictional force sensor for obtaining road frictional force information according to road frictional force F acting between a wheel of a car and a road on which the car is moving;
a brake torque sensor for obtaining braking torque information according to braking torque T acting between the wheel of the car and a braking device;
a differential parameter calculating means for calculating a differential parameter M according to the road frictional force information and the braking torque information;
a wheel velocity parameter calculating means for calculating a wheel velocity parameter Mω by correcting and then integrating the differential parameter M, the wheel velocity parameter Mω becoming 0 when the wheel is locked; and
a brake fluid pressure controlling means for controlling the fluid pressure of the braking device by using the wheel velocity parameter Mω.

24. The ABS apparatus according to claim 23,
further comprising a gravitational acceleration sensor for obtaining gravitational acceleration information according to gravitational acceleration G acting on the car,
wherein the wheel velocity parameter calculating means obtains the wheel velocity parameter Mω by integrating a difference between the differential parameter M and the gravitational acceleration G.

25. The ABS apparatus according to claim 23, wherein the wheel velocity parameter calculating means obtains the wheel velocity parameter Mω by integrating a difference between the differential parameter M and a value proportional to a first threshold of the differential parameter M, the first threshold being determined according to a peak value of the differential parameter M.

26. The ABS apparatus according to claim 25 further comprising:
a gravitational acceleration sensor for obtaining gravitational acceleration information according to gravitational acceleration G acting on the car;
a gravitational acceleration change rate calculating means for calculating a gradient of a locus given by the gravitational acceleration G; and
a first threshold varying means for varying the first threshold according to the gradient of the locus calculated by the gravitational acceleration change rate calculating means.

27. The ABS apparatus according to claim 25, further comprising:
a two-point difference calculating means for calculating a difference in the wheel velocity parameter Mω at a predetermined time interval; and
a first threshold varying means for varying the first threshold according to the difference in the wheel velocity parameter Mω calculated by the two point difference calculating means.

28. The ABS apparatus according to claim 25, further comprising:
a road frictional force change rate calculating means for calculating a difference between a present value of the road frictional force information in a presently performed pressure reducing operation and a previous value of the road frictional force information in a previously performed pressure reducing operation; and
a first threshold varying means for varying the first threshold according to an amount of change in the road frictional force information calculated by the road frictional force change rate calculating means.

29. The ABS apparatus according to claim 23, further comprising:
a gravitational acceleration sensor for obtaining gravitational acceleration information according to gravitational acceleration G acting on the car; and
a gravitational acceleration integrating means for integrating the gravitational acceleration G;
wherein the brake fluid pressure controlling means sets a reference line by translating a locus of the integration given by the gravitational acceleration integrating means so as to coincide with the wheel velocity parameter Mω upon start of a brake fluid pressure reducing operation and stops the brake fluid pressure reducing operation when the wheel velocity parameter Mω crosses the reference line after the brake fluid pressure reducing operation is started.

30. The ABS apparatus according to claim 29, wherein the brake fluid pressure controlling means starts a pressure reducing operation when the differential parameter M drops to a first threshold and for subsequently stopping the pressure reducing operation when the differential parameter M rises to a second threshold upon lapse of a minimum pressure reducing period.

31. The ABS apparatus according to claim 23, wherein the brake fluid pressure controlling means sets a straight reference line passing two points of the wheel velocity parameter Mω taken upon start of a brake fluid pressure reducing operation and a predetermined time before the start of the brake fluid pressure reducing operation, respectively, for stopping the brake fluid pressure reducing operation when the wheel velocity parameter Mω crosses the reference line after the brake fluid pressure reducing operation is started.

32. The ABS apparatus according to claim 31, wherein the brake fluid pressure controlling means compares a gradient of a current reference line with that of a previous reference line, and corrects the current reference line by setting the predetermined time longer if there is an increase in the gradient, or by setting the predetermined time shorter if there is a decrease in the gradient.

33. The ABS apparatus according to claim 23, further comprising:
a gravitational acceleration sensor for obtaining gravitational acceleration information according to gravitational acceleration G acting on the car; and
a gravitational acceleration integrating means for integrating the gravitational acceleration G;
wherein the brake fluid pressure controlling means sets a quick pressurization judging line by translating a locus of the integration given by the gravitational acceleration integrating means so as to become slightly larger than the wheel velocity parameter Mω upon start of a brake fluid pressure reducing operation for rapidly increasing the brake fluid pressure when the wheel velocity parameter Mω crosses the quick pressurization judging line after the brake fluid pressure reducing operation is stopped.

34. The ABS apparatus according to claim 23, further comprising:

a gravitational acceleration sensor for obtaining gravitational acceleration information according to gravitational acceleration G acting on the car; and a gravitational acceleration integrating means for integrating the gravitational acceleration G;

wherein the brake fluid pressure controlling means judges an over slipping situation to be present in the wheel if a gradient of a locus given by the integration performed by the gravitational acceleration integrating means is smaller than a predetermined value when the wheel velocity parameter Mω turns from a decreasing tendency to an increasing tendency.

35. An ABS apparatus comprising:

a frictional force sensor for obtaining road frictional force information according to road frictional force F acting between a wheel of a car and a road on which the car is moving;

a brake torque sensor for obtaining braking torque information according to braking torque T acting between the wheel of the car and a braking device;

a differential parameter calculating means for calculating a differential parameter M according to the road frictional force information and the braking torque information;

a wheel velocity parameter calculating means for calculating a wheel velocity parameter Mω by correcting then integrating the differential parameter M, the wheel velocity parameter Mω becoming 0 when the wheel is locked;

a wheel velocity acceleration parameter calculating means for calculating a wheel velocity acceleration parameter dMω/dt by differentiating the wheel velocity parameter Mω calculated by the wheel velocity parameter calculating means; and a brake fluid pressure controlling means for controlling the fluid pressure of the braking device by using the wheel acceleration parameter dMω/dt calculated by the wheel acceleration parameter calculating means.

* * * * *